United States Patent [19]
Hashizume et al.

[11] Patent Number: 6,000,802
[45] Date of Patent: Dec. 14, 1999

[54] PROJECTION-TYPE DISPLAY APPARATUS

[75] Inventors: Toshiaki Hashizume; Hisashi Iechika; Yasunori Ogawa; Shinji Haba; Akitaka Yajima, all of Suwa, Japan

[73] Assignee: Seiko Epson Corporation, Tokyo, Japan

[21] Appl. No.: 09/163,163

[22] Filed: Sep. 30, 1998

Related U.S. Application Data

[63] Continuation of application No. 08/912,565, Aug. 18, 1997.

[30] Foreign Application Priority Data

| Aug. 19, 1996 | [JP] | Japan | 8-217652 |
| Jul. 15, 1997 | [JP] | Japan | 9-190004 |

[51] Int. Cl.$^6$ .................................................. G03B 21/14
[52] U.S. Cl. .......................... 353/38; 353/20; 353/31; 349/61; 349/5
[58] Field of Search .................. 353/31, 20, 33, 353/34, 37, 38, 101, 98, 99, 119, 69, 70; 349/5, 7, 8, 9, 61, 62

[56] References Cited

U.S. PATENT DOCUMENTS

| 5,098,184 | 3/1992 | Van Den Brandt | 353/31 |
| 5,418,583 | 5/1995 | Masumoto | 353/38 |
| 5,418,586 | 5/1995 | Fujimori et al. | 353/34 |
| 5,626,409 | 5/1997 | Nakayama et al. | 353/34 |
| 5,649,753 | 7/1997 | Masumoto | 353/38 |
| 5,662,401 | 9/1997 | Shimizu et al. | 353/38 |
| 5,755,503 | 5/1998 | Chen et al. | 353/38 |
| 5,786,939 | 7/1998 | Watanabe | 353/38 |

FOREIGN PATENT DOCUMENTS 3-111806   5/1991   Japan .

*Primary Examiner*—William Dowling
*Attorney, Agent, or Firm*—Oliff & Berridge, PLC

[57] ABSTRACT

An output light from an light source lamp unit 8 in a projection-type display apparatus illuminates liquid-crystal light valves 925R, 925G and 925B for three colors via an integrator optical system 923. A superimposing lens 930 that is a component of the integrator optical system 923 as a uniform illumination optical system is arranged such that the mounting position of the superimposing lens 930 is fine-adjustable in a direction orthogonal to an optical axis 1a. By fine-adjusting the mounting position of the superimposing lens 930, the position of an illumination area B is adjusted such that the illumination area includes the image forming area A of the liquid-crystal light valve. It is not necessary to assure a wide margin around the image forming area A to cover the offset of the position of the illumination area B. As a result, the utilization of illumination light is heightened and a bright projected image results.

19 Claims, 13 Drawing Sheets

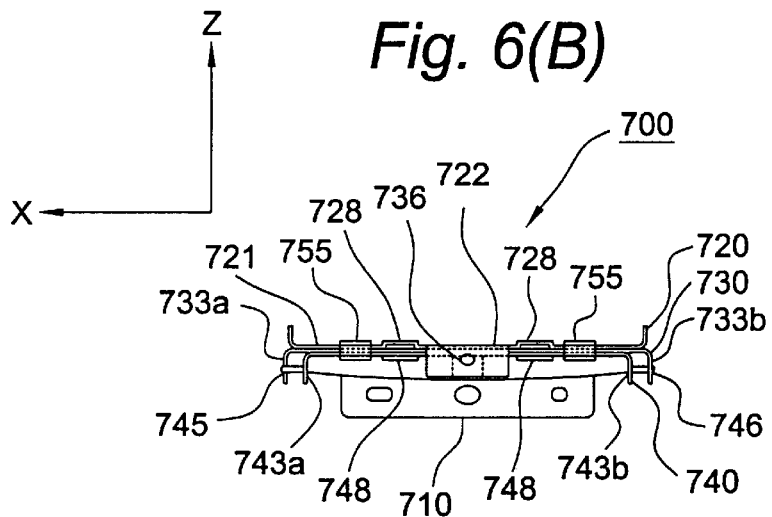
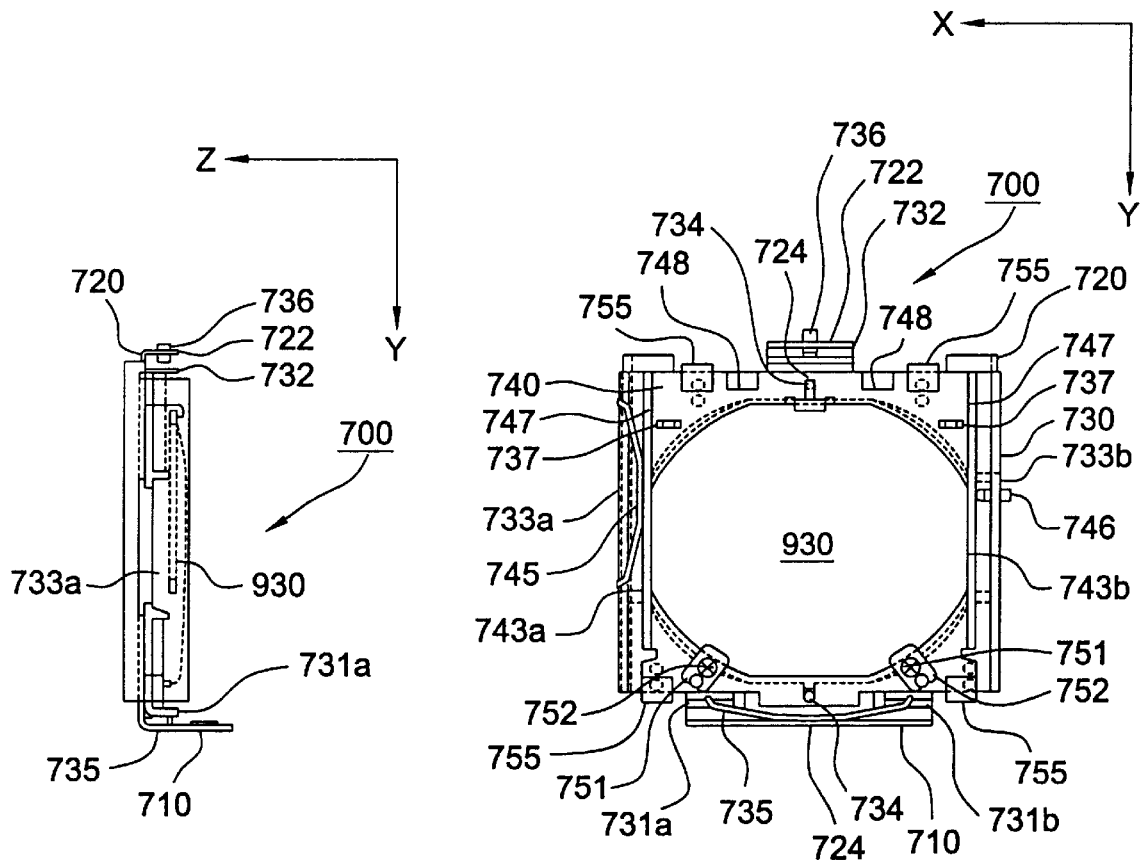

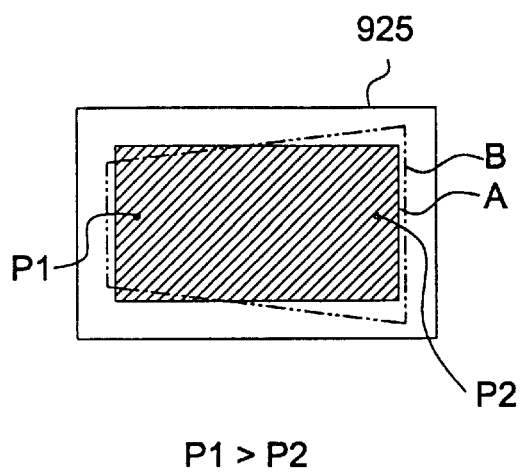
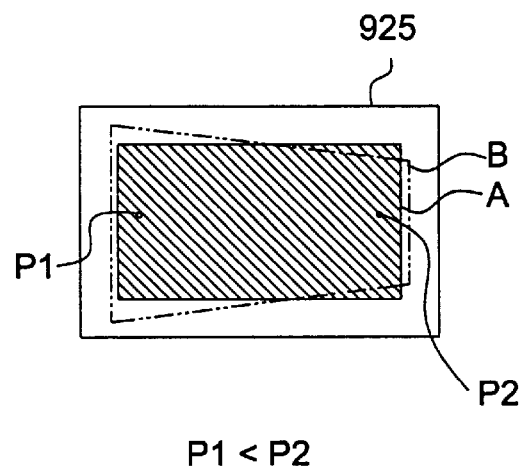
P1 > P2
P1 < P2
Fig. 7(A)
Fig. 7(B)

PROJECTION-TYPE DISPLAY APPARTUS 2000

PROJECTION-TYPE DISPLAY APPARTUS

PROJECTION-TYPE DISPLAY APPARATUS

This is a Continuation Application of application Ser. No. 08/912,565 filed Aug. 18, 1997 and now allowed. The entire disclosure of the prior application is hereby incorporated by reference herein in its entirety.

BACKGROUND OF THE INVENTION

1. Field of Invention

The present invention relates to a projection type display apparatus that modulates an output light beam from a light source in response to a video signal using a modulating device such as a liquid-crystal light valve or the like and enlarges and projects the modulated light beam through a projection lens onto a screen. More particularly, the present invention relates to a projection-type display apparatus that illuminates an image forming area of the modulating device such as a liquid-crystal light valve.

2. Description of Related Art

Japanese Unexamined Patent Publication 3-111806 discloses a projection-type display apparatus that forms a modulated light beam in response to a video signal using a liquid-crystal light valve and enlarges and projects the modulated light beam onto a screen. As shown in FIG. 13, the projection-type display apparatus includes an integrator optical system 923 having two lens plates 921 and 922, for uniformly illuminating the image forming area of a liquid-crystal light valve 925, as a modulating device, with light from a light source.

The single light beam emitted from a light source lamp unit 8 is split into a plurality of intermediate light beams by lenses 921a constituting the first lens plate 921, and is superimposed on the liquid-crystal light valve 925 through lenses 922a constituting the second lens plate 922.

In this projection-type display apparatus, the brightness of an image projected onto the screen will drop or the projected image suffers an outlining shadow if the image forming area of the liquid-crystal light valve 925 is not accurately illuminated. To cope with this problem, as shown in FIG. 14, a certain margin M is assured around the image forming area A of the liquid-crystal light valve 925 in view of the positioning accuracies of the liquid-crystal light valve 925 and the lens plates 921, 922 constituting the integrator optical system 923, the positional errors in the focal points of the lenses 921a, 922a of the lens plates and the positioning accuracies of the remaining optical systems disposed along the optical axis.

More particularly, the image forming area A is sized to be distinctly smaller than an illumination area B by the output light from the light source. Even if the illumination area B is offset vertically upward or downward, or horizontally leftward or rightward depending on the overall positioning accuracy of the above components, the image forming area A is designed to be kept within the illumination area B. This avoids the outlining shadow around the projected image and drop in brightness of the projected image. To cope with a large quantity of positional error of the components, the margin M is simply widened.

To increase the brightness of a projected image, the efficiency in the utilization of the light that illuminates the liquid-crystal light valve 925 needs to be increased. If the margin M is enlarged to accommodate errors of the components, the efficiency in the utilization of light drops, thereby dimming the projected image. Thus, the width of the margin formed around the image forming area of the liquid-crystal light valve is preferably narrow. A narrow margin in turn offsets the illumination area from the image forming area of the liquid-crystal light valve, possibly presenting a shadow outlining the projected image.

SUMMARY OF THE INVENTION

It is an object of the present invention to provide a projection-type display apparatus that offers an increased image brightness without any shadow around a projected image while presenting a narrow margin around the image forming area of a liquid-crystal light valve.

A first projection-type display apparatus of the present invention may include a light source, a modulating device for modulating a light beam emitted by the light source and a projection device for enlarging and projecting the modulated light beam from the modulating device onto a projection area. An optical element may be disposed in an optical path between the light source. The modulating device may split the light beam emitted from the light source into a plurality of intermediate light beams. A superimposing device may also be provided for superimposing each of the split intermediate light beams from the optical element on an image forming area of the modulating device. The mounting position of the superimposing device may be adjustable.

This may increase the efficiency in the utilization of illumination light that illuminates the modulating device, thereby brightening a projected image. Even when the margin around the image forming area of the modulating device is narrowed, the illumination area relative to the modulating device is fine-adjusted so that the image forming area is kept within the illumination area and the projected image is free from the outlining shadow attributed to any offset between the image forming area and the illumination area.

After components of the optical systems are mounted, the image forming area of the modulating device is illuminated by the optical element and the superimposing device. When the illumination area is offset from the image forming area of the modulating device, the superimposing device is fine-adjusted so that the image forming area of the modulating device is fully included within the illumination area. Taking into consideration the offset between the illumination area and the image forming area, attributed to the positioning error of the optical components, the margin formed around the outline of the image forming area of the modulating device is narrowed.

Since the mounting position of the superimposing device, which is an optical component chiefly determining the illumination area of the modulating device, may be fine-adjusted, the position of the illumination area of the modulating device is easily and efficiently adjusted. The adjustment of the position of the illumination area is thus performed taking into consideration the overall mounting error of optical components (optical elements) in front of the superimposing device (upstream of the superimposing device in the optical path).

Since the plurality of split intermediate light beams are finally superimposed on a single illumination area through the superimposing device and are then delivered, a constant-brightness polarized light beam with no illuminance variations is obtained as an illumination light even when an incident light beam has a large light intensity distribution in its cross section. A constant-brightness polarized light beam with no illuminance variations may be obtained as an illumination light when the incident light beam has a uniform light intensity, when the intermediate light beam cannot be separated into a p-polarized light and an s-polarized light beam because of spectral characteristics, or when the light intensity and spectral characteristics change in the course of aligning the polarization directions of both polarized light beams.

The projection-type display apparatus may present a particularly bright projected image that is uniform and bright on an entire display area or projection area.

A reflection device for bending an optical path may be disposed in the optical path extending from the light source to the modulating device. If an error is introduced in the mounting angle of the reflection device, the illumination area may be offset from the image forming area of the modulating device. The mounting angle of the reflection device is such that it is preferably adjustable relative to its incident optical axis.

The projection-type display apparatus may be applied to a projection-type display apparatus for projecting a color image. More particularly, it may be applied to a projection-type display apparatus including a color separating optical system for separating an output light from the superimposing device into color light beams, a plurality of modulating devices for modulating the color light beams separated by the color separating optical system, and a color synthesizing optical system for synthesizing the color light beams respectively modulated by the plurality of modulating device. The synthesized modulated light beam from the color synthesizing optical system may be enlarged and projected through the projection device to the projection area.

In the projection-type display apparatus for projecting a color image, a reflection device may be disposed in an optical path between the color separating optical system and at least one of the plurality of modulating devices. The illumination area may be offset depending on the mounting angle of the reflection device. The reflection device may be preferably adjustable in its mounting angle with respect to the incident optical axis.

The reflection device disposed closest to the modulating device remaining adjustable in its mounting angle is advantageous from the standpoint of assembling the apparatus and position adjusting the illumination area relative to the modulating device.

If the modulating device is a reflection type modulating device and the color separating optical system and the color synthesizing optical system are integrated into the same optical system, the optical path length is shortened to result in a compact-design projection-type display apparatus.

A second projection-type display apparatus of the present invention may include a light source, a first optical element for splitting a light beam from the light source into a plurality of intermediate light beams and a second optical element comprising a polarization conversion unit and a superimposing device for superimposing light beams output from the polarization conversion unit. The polarization conversion unit may be arranged in the vicinity of a position where the intermediate light beams are converged to separate each of the split intermediate light beams from the first optical element into a p-polarized light beam and an s-polarized light beam. The polarization conversion unit may further align the polarization direction of one of the p-polarized light beam and the s-polarized light beam with the polarization direction of the other of the p-polarized light beam and the s-polarized light beam and output the resulting light beams. A modulating device may modulate the light beams emitted from the second optical element and a projection device may enlarge and project the modulated light beams from the modulating device to a projection area. The mounting position of the superimposing device may be adjustable.

The polarization conversion unit may be additionally provided besides the arrangement according to the first aspect, and thus, the second projection-type display apparatus presents the advantage offered by the use of the polarization conversion unit in addition to the advantage presented by the first projection-type display apparatus. More particularly, with the polarization conversion unit, polarizing light beams are efficiently used without wasting both light beams to thereby result in a bright projected image.

A reflection device for bending an optical path may be disposed in the optical path extending from the light source to the modulating device. The second projection-type display apparatus may be used in a projection-type display apparatus for projecting a color image. The mounting angle of the reflection device disposed closest to the modulating device may be adjustable and the modulating device may be a reflection type modulating device. Thus, the same advantages offered by the first projection-type display apparatus are achieved.

To make the mounting position of the superimposing device adjustable in the first projection-type display apparatus, an adjusting mechanism may be provided. More particularly, a first adjusting mechanism may be provided for adjusting the mounting position of the superimposing device in a first direction that is orthogonal to an optical axis. A second adjusting mechanism may be provided for adjusting the mounting position of the superimposing device in a second direction that is orthogonal to both the optical axis and the first direction.

A base adjusting plate may be provided to realize such an adjusting mechanism. Further, a first adjusting plate slidably movable in the first direction relative to the base adjusting plate and a second adjusting plate slidably movable in the second direction relative to the first adjusting plate may also be provided. With this mechanism, the mounting position of the superimposing device may be independently adjusted in individual directions (i.e., in the first and second directions).

The mounting position of the superimposing device may be difficult to adjust if the first adjusting plate is offset in the second direction when the second adjusting plate is slid in the second direction or if the second adjusting plate is offset in the first direction when the first adjusting plate is slid in the first direction. For this reason, the adjusting mechanism preferably includes a first slip prevention mechanism for preventing the first adjusting plate from slipping in the second direction and a second slip prevention mechanism for preventing the second adjusting plate from slipping in the first direction. This solves some of the above problems and the mounting position of the superimposing device is easily and accurately adjusted. When the adjusting mechanism including the first and second adjusting plates is employed, the superimposing device may be fixed to the second adjusting plate.

In the second projection-type display apparatus an adjusting mechanism may be provided to make the mounting position of the superimposing device adjustable.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIGS. 6(A)–(C) show a lens mounting position adjusting mechanism;

FIGS. 7(A) and 7(B) are explanatory views showing the illumination areas of the integrator optical system by the reflection surface of the reflection device;

FIG. 8(A) is an explanatory view of a holder plate, FIG. 8(B) is a plan view of the fine-adjustment mechanism, and FIG. 8(C) is a cross-sectional view of the fine-adjustment mechanism;

DETAILED DESCRIPTION OF PREFERRED EMBODIMENTS

Figure 1:
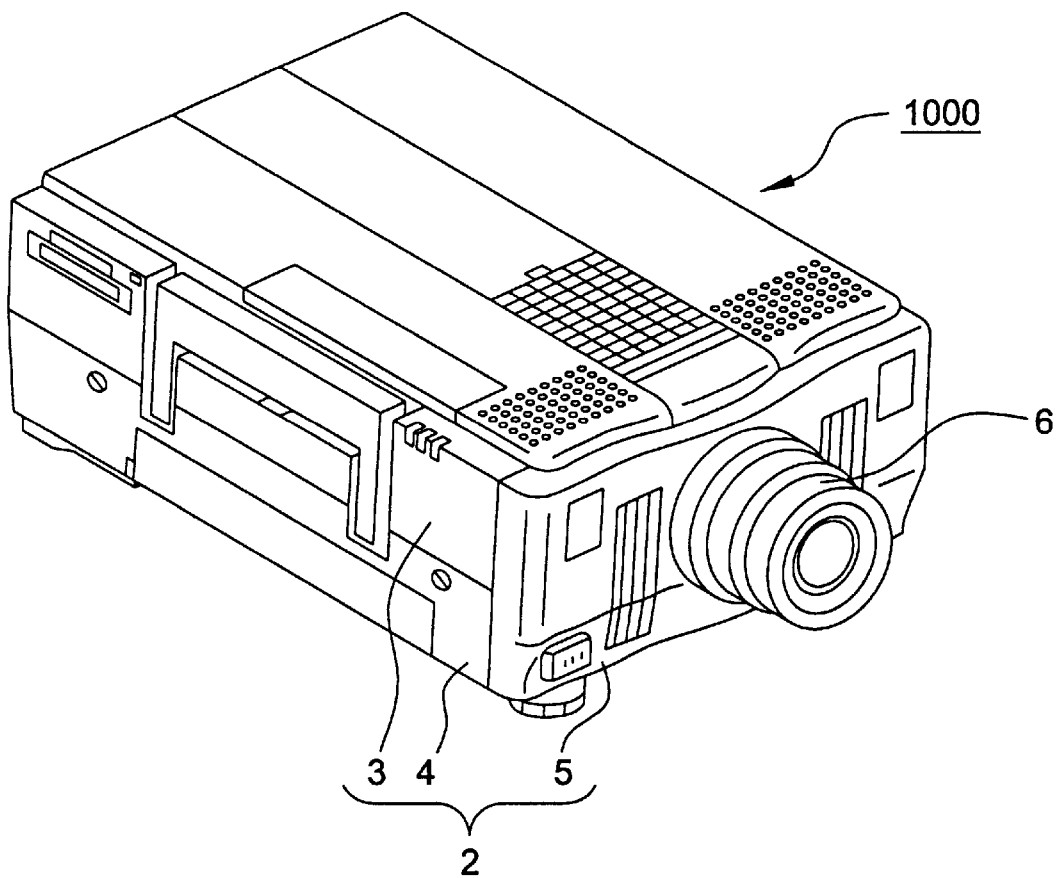
FIG. 1 is an external view of the projection-type display apparatus of the present invention.

FIG. 1 shows an external view of the projection-type display apparatus of one embodiment of the present invention. The projection-type display apparatus 1000 picks up red, blue and green color light beams from a light emitted from a light source and passes the light beams through an integrator optical system and a color separating optical system. The apparatus further guides each color light beam to a liquid-crystal light valve arranged correspondingly to a respective color, modulates it according to a color video signal, synthesizes the modulated light beams for the three colors through a color synthesizing optical system, and then enlarges and projects the synthesized color image onto a projection screen.

As shown in FIG. 1, the projection-type display apparatus 1000 has a rectangular parallelopiped outer casing 2. The outer casing 2 may include an upper case 3, a lower case 4 and a front case 5 that forms the front of the apparatus. A projection lens unit 6 projects out of the center of the front case 5.

Figure 2A:
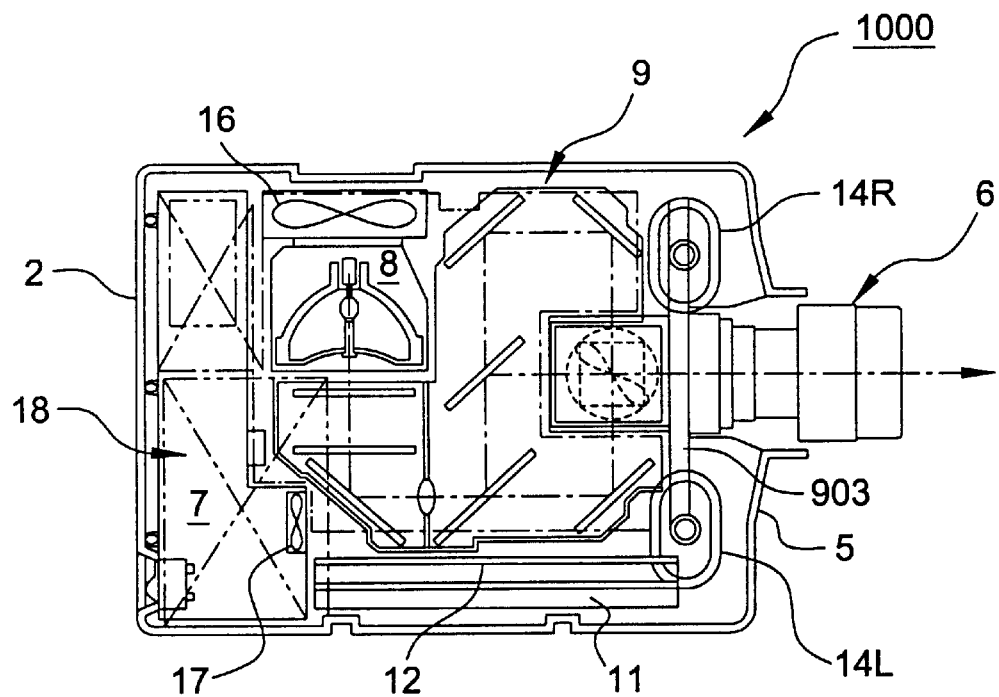
FIG. 2(A) is a general plan view showing the internal structure of the projection-type display apparatus.
Figure 2B:
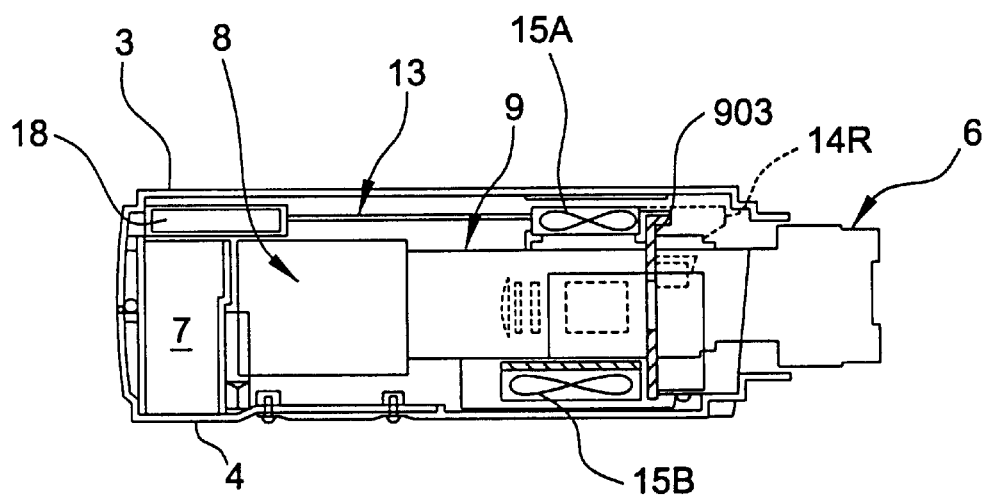
FIG. 2(B) is a sectional view of the apparatus.

FIGS. 2(A)–2(B) show the positional relationship of components inside the outer casing 2 of the projection-type display apparatus 1000. A power supply unit 7 is housed in the rear portion inside the outer casing 2. A light source lamp unit 8 is arranged in front of the power supply unit 7. An optical unit 9 is also arranged in front. The projection lens unit 6 is mounted with its base end portion positioned at the center front of the optical unit 9.

An interface board 11 is disposed on one side of the optical unit 9 having an input/output interface circuit that extends from front to back in the casing. A video board 12 having a video signal processing circuit extends in parallel with the interface board 11. A control board 13 for driving and controlling the apparatus is mounted above the light source lamp unit 8 and optical unit 9. Loudspeakers 14R, 14L are respectively installed on the left-front and right-front corners in the apparatus.

A suction fan 15A for cooling is installed on the center of the top surface of the optical unit 9 and a circulating fan 15B for circulating cooling air is attached on the center of the underside of the optical unit 9. Furthermore, an exhaust fan 16 is attached to the rear side of the light source lamp unit 8 facing one side of the apparatus. An auxiliary cooling fan 17 is disposed on one side of the power supply unit 7 close to the rear ends of the boards 11, 12 for sucking cooling air from the suction fan 15A into the power supply unit 7.

A floppy disk drive unit (FDD) 18 is disposed on top of the power supply unit 7 on the left-hand side of the apparatus.

Figure 3:
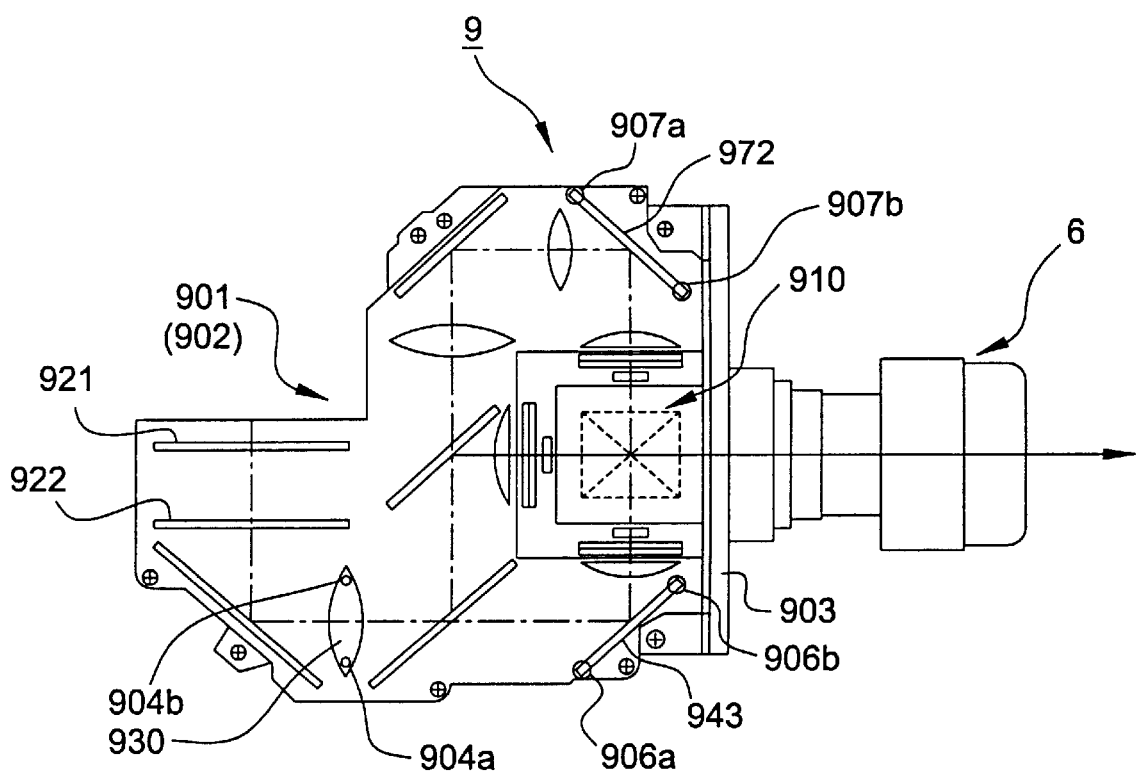
FIG. 3 is a plan view showing an optical unit and a projection lens unit.

FIG. 3 shows the optical unit 9 and the projection lens unit 6 dismounted from the casing. The optical unit 9 has optical elements (except a prism unit 910 constituting a color synthesizing device) interposed between upper and lower light guides 901, 902. The upper light guide 901 and lower light guide 902 are, respectively, secured to the upper case 3 and lower case 4 using fixing screws. The upper and lower light guides 901, 902 are also secured to sides of the prism unit 910 using fixing screws. The prism unit 910 is secured to the inside of a diecast head plate 903 using fixing screws. The base section of the projection lens unit 6 is bolted to the front side of the head plate 903.

Figure 4:
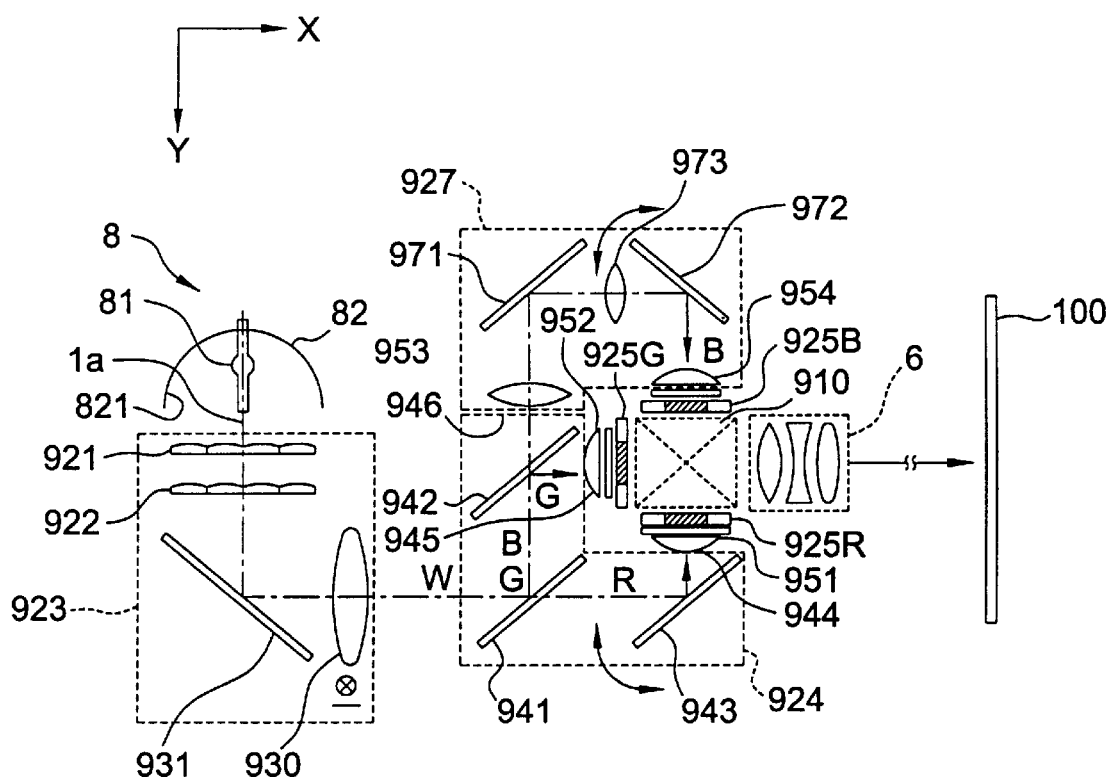
FIG. 4 is a general view of the optical system to be assembled in the optical unit.

FIG. 4 shows an optical system assembled into the optical unit 9. The optical system of this embodiment includes a discharge lamp 81, an element constituting the light source lamp unit 8 and an integrator optical system 923 including a first lens plate 921 and a second lens plate 922 as uniform illumination optical elements. The optical system further includes a color separating optical system 924 for separating a white light beam W emitted from the integrator optical system 923 into red, green and blue color light beams R, G, and B and three liquid-crystal light valves 925R, 925G, and 925B for respectively modulating the color light beams. The prism unit 910 synthesizes modulated color light beams and the projection lens unit 6 enlarges and projects the synthesized light beam to the surface of a screen 100. A light guide system 927 guides the blue color light bear B out of the color light beams separated by the color separating optical system 924 to a liquid-crystal light valve 925B.

A halogen lamp, a metal halide lamp or a xenon lamp may be used as the discharge lamp 81. The uniform illumination optical system 923 may be provided with a reflection mirror 931 that bends at a right angle the central optical axis 1a of the output light from the integrator optical system 923 toward the front of the apparatus. The first and second lens plates 921, 922 are perpendicular to a superimposing lens 930 with the mirror 931 located in between.

The output light from the discharge lamp 81 is reflected in the form of parallel light beams by the reflection surface 821 of a reflector 82 and is directed to the first lens plate 921. Then the light beams as a secondary light source image are directed to the incidence surface of each lens constituting the second lens plate 922 and the secondary light source images are superimposed through the superimposing lens 930 on objects to be illuminated. More particularly, the image forming areas of the liquid-crystal light valves 925R, 925G and 925B are illuminated.

The color separating optical system 924 may include a blue/green-reflecting dichroic mirror 941, a green-reflecting dichroic mirror 942, and a reflecting mirror 943. The blue light beam B and the green light beam G contained in the white light beam W are first reflected at a right angle from the blue/green-reflecting dichroic mirror 941 toward the green-reflecting mirror 942.

The red light beam R passes through the blue/green-reflecting dichroic mirror 941 and is reflected at a right angle from the reflecting mirror 943 downstream thereof and is delivered toward the prism unit 910 through the delivery section 944 for the red light beam. The green light beam G is reflected from the mirror 941 and is reflected at a right angle from the green-reflecting mirror 942 and is delivered toward the prism unit 910 through the delivery section 945 for the green light beam. The blue light beam B passing through the mirror 942 is delivered toward the light guide system 927 through the delivery section 946 for the blue light beam. In this embodiment, the distances from the delivery section of the white light beam of the integrator optical system 923 respectively to the delivery sections 944, 945, and 946 in the color separating optical system 924 are set to be equal.

Converging lenses 951, 952 are respectively arranged on the exit sides of the delivery sections 944, 945 for red and green light beams in the color separating optical system 924. These color light beams from the respective delivery sections are therefore made parallel through the converging lenses 951, 952.

The red and green light beams R, G in their parallel form are respectively introduced into the liquid-crystal light valves 925R, 925G to be modulated. Image information is imparted to each color light beam. More particularly, these light valves are switching-controlled by the image information by a driving device (not shown) and the color light beams passing therethrough are thus modulated. Any known device may be used as the driving device. The blue light beam B on the other hand is guided to the liquid-crystal light valve 925B through the light guide system 927, where it is equally modulated according to image information. The light valves in this embodiment may be the one that employs a polysilicon TFT as a switching element.

The light guide system 927 may include a converging lens 953, an input reflecting mirror 971, an output reflecting mirror 972, an intermediate lens 973 disposed between the input reflecting mirror 971 and the output reflecting mirror 972 and a converging lens 954 disposed in front of the liquid-crystal panel 925B. Among the lengths of the optical paths of the color light beams from the delivery section for the white light beam in the integrator optical system to the respective liquid-crystal light valves 925R, 925G and 925B, the length of the optical path of the blue light beam B is the longest and thus the blue light beam suffers a maximum loss. However, by arranging the light guide system 927 the light loss that the blue light beam suffers is restricted.

The color light beams modulated through the respective liquid-crystal light valves 925R, 925G, and 925B are introduced into the prism unit 910 to be synthesized. In this embodiment, a dichroic prism is used as the color synthesizing optical system. A color image is enlarged and projected through the projection lens unit 6 to the screen 100 at a predetermined position.

In this projection-type display apparatus 1, the illumination area of the liquid-crystal light valve 925 determined by the integrator optical system 923 is fine-adjusted vertically up or down and horizontally to the left or right relative to the image forming area of the liquid-crystal light valve shown in FIG. 5.

Figure 5A:
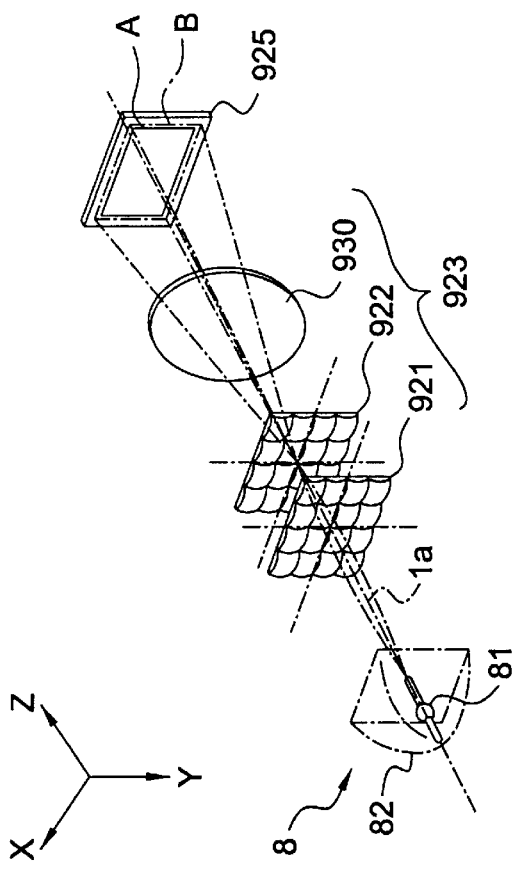
FIGS. 5(A)–(D) show the relationship between an illumination area and a liquid-crystal light valve in an integrator optical system.

FIG. 5(A) illustrates the relationship between the illumination area of the liquid-crystal light valve 925 determined by the integrator optical system 923 and the image forming area A of the liquid-crystal light valve 925. In FIG. 5(A), the projection area of the screen 100 is typically rectangular and the image forming area A of the liquid-crystal light valve 925 is accordingly rectangular. The illumination area B (represented by phantom lines) determined by the integrator optical system 923 is likewise rectangular.

The image forming area A of the liquid-crystal light valve 925 is sized to be distinctly smaller than the illumination area B. In other words, the display area A has a margin of a predetermined width. With the margin the image forming area A is continuously included within the illumination area B even if the illumination area B is offset in position because of the position errors of the first and second lens plates 921, 922 of the integrator optical system 923 and the superimposing lens 930.

The superimposing lens 930 may be fine-adjusted vertically and horizontally in a plane orthogonal to the optical axis 1a as shown by arrows using position adjusting mechanisms. For example, plate springs attached to the upper and lower light guides 901, 902 and position adjusting screws may be used as position adjusting mechanisms.

FIGS. 6(A)–6(C) show an example of a mechanism for fine-adjusting the mounting position of the superimposing lens 930 vertically and horizontally. FIG. 6(A) shows the mechanism for fine-adjusting the mounting position of the superimposing lens 930, viewed from the upstream side along the optical path. FIG. 6(B) shows the mechanism viewed from the side of the upper light guide 901 and FIG. 6(C) shows the mechanism viewed from its one side. A lens mounting position adjusting mechanism 700 is provided with a lower base plate 710, which in turn is bolted to the lower light guide 902. A lens adjusting base plate (base adjusting plate) 720 is secured to the lower base plate 710 such that the lens adjusting base plate 720 is orthogonal to the optical path. The lens adjusting base plate 720 has a vertical wall 721 and a horizontal flange 722 that horizontally extends from the center of the top edge of the vertical wall 721 toward the upstream side along the optical path (+Z direction). The vertical wall 721 supports a lens vertical adjusting plate (first adjusting plate) 730 in parallel therewith. The lens vertical adjusting plate 730 has bottom flanges 731a, 731b extending from its bottom edge toward an upstream side along the optical path and a top flange 732 extending from its top edge toward the upstream side along the optical path. The bottom flanges 731a, 731b of the lens vertical adjusting plate 730 are supported by an alignment spring 735 at the lower base plate 710 and the top flange 732 is pressed downward by an adjusting screw 736 attached to the top flange 722 of the lens adjusting base plate 720. By adjusting the screwed depth of the adjusting screw 736, the lens vertical adjusting plate 730 is shifted vertically upward or downward (±Y directions) relative to the lens adjusting base plate 720.

The lens vertical adjusting plate 730 has a pair of slots 734 in the Y direction and the lens adjusting base plate 720 has a pair of projections 724 that are respectively received in the slots 734 as a slip prevention mechanism that prevents the lens vertical adjusting plate 730 from shifting leftward and rightward (in ±X directions) when the mounting position of the superimposing lens 930 is adjusted vertically upward or downward (±Y directions) by using the adjusting screw 736.

The lens vertical adjusting plate 730 supports a lens horizontal adjusting plate (second adjusting plate) 740 in parallel therewith. The lens vertical adjusting plate 730 has a pair of left-hand side and right-hand side flanges 733a, 733b extending toward the upstream side along the optical path while the lens horizontal adjusting plate 740 has side flanges 743a, 743b respectively extending in parallel with the side flanges 733a, 733b. The side flanges 743a of the lens horizontal adjusting plate 740 is urged by an alignment spring 745 supported by the side flange 733a toward the side flange 743b while the side flange 743b is pressed by an adjusting screw 746 attached to the side flange 733b toward the side flange 743a. By adjusting the screwed depth of the adjusting screw 746, the lens horizontal adjusting plate 740 is shifted horizontally to the left or to the right (in ±X directions) relative to the lens vertical adjusting plate 730.

The lens horizontal adjusting plate 740 has a pair of slots 747 in the X direction and the lens vertical adjusting plate 730 has a pair of projections 737 that are respectively received in the slots 747 as a slip prevention mechanism that prevents the lens horizontal adjusting plate 740 from shifting vertically upward and downward (in ±Y directions) when the mounting position of the superimposing lens 930 is adjusted to the left or to the right (in ±X directions) by using the adjusting screw 746.

The superimposing lens 930 is attached to the lens horizontal adjusting plate 740 such that it occupies the generally central portion of the lens horizontal adjusting plate 740. In this embodiment, the superimposing lens 930 is supported at part of its top portion by a bracket and at its bottom portion at two points by plate springs 752 fixed by screws 751. Each of the three plates, which are components constituting the lens mounting position adjusting mechanism 700, namely, the lens adjusting base plate 720, lens vertical adjusting plate 730 and lens horizontal adjusting plate 740 is provided with an opening for guiding the light from the superimposing lens 930 to the color separating optical system.

In the lens mounting position adjusting mechanism 700, the three plates (i.e., the lens adjusting base plate 720, lens vertical adjusting plate 730 and lens horizontal adjusting plate 740) are supported at four points, two on their top portion and two on their bottom portion, by U-shaped adjusting plate fixing springs 755. For this reason, the mounting position of the superimposing lens 930 is adjusted vertically upward or downward, and horizontally to the left or to the right with the lens mounting position adjusting mechanism 700 remaining fixed to the lower light guide 902. The lens adjusting base plate 720 and lens horizontal adjusting plate 740 are respectively provided with adhesive wells 728, 748 on their top portions. After the adjustment of the mounting position of the superimposing lens 930 is complete, an adhesive is introduced into these wells through adhesive applying ports 904a, 904b (FIG. 3) formed in the upper light guide 901 to bond the three plates and thus prevent the superimposing lens 930 from offsetting from its mounting position.

Figure 5D:
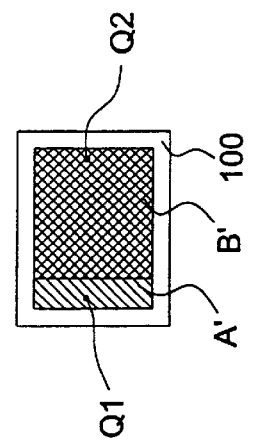
Figures 5B, 5C:
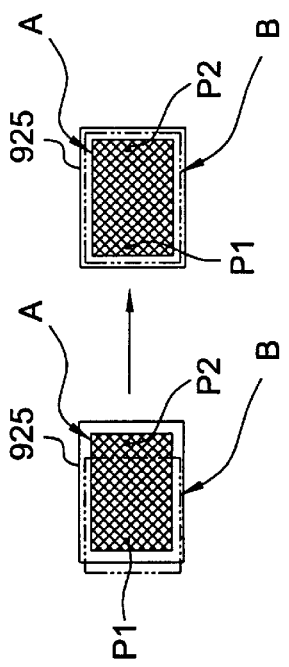

The mounting position of the superimposing lens 930 is thus enabled to be fine-adjusted vertically upward or downward and horizontally to the left or to the right and when the illumination area B is horizontally offset from the image forming area A of the liquid-crystal light valve 925 causing the image forming area A to be left partly unilluminated as shown in FIG. 5(B), the superimposing lens 930 is fine-adjusted in its position by tightening or loosening the adjusting screw 764 to horizontally move the position of the illumination area until the image forming area A is correctly put in the illumination area B as shown in FIG. 5(C). When the illumination area B is offset from the image forming area of the liquid-crystal light valve 925 with the image forming area A left partly unilluminated, the superimposing lens 930 is fine-adjusted in its mounting position vertically upward or downward by tightening or loosening the adjusting screw 736 to put the image forming area A correctly into the illumination area B in the same manner.

The fine-adjustment of the superimposing lens 930 in the horizontal direction (±X direction) may be automatically or manually performed by measuring luminance in the periphery portion around the projected image formed by the liquid-crystal light valve 925G and projected onto the screen. More particularly, in the condition shown in FIG. 5(B), the illumination area B is offset leftward, and illuminance drops in the rightmost portion of the image forming area of the liquid-crystal light valve 925G. To correct the offset of the illumination area B, the superimposing lens 930 may be shifted in its mounting position horizontally to the left or to the right (±X direction) until illuminances P1 and P2 on the left-hand side and right-hand side of the image forming area A become constant. Since this method sets a predetermined constant value beforehand, a difficulty is presented when the light source is changed to the one with small light intensity.

If the superimposing lens 930 is designed to shift horizontally in its mounting position to the left or to the right until luminances P1 and P2 on the left-hand side and right-hand side of the image forming area A become equal, the setting of the predetermined constant value is not required. Thus, this method works even when the light source is changed to one with small light intensity. Furthermore, if the superimposing lens 930 is designed to horizontally shift in its mounting position to the left or to the right until the sum of luminances P1 and P2 on the left-hand side and right-hand side of the image forming area A is maximized, the predetermined setting of the constant value is not required either. Thus, this method also works even when the light source is changed to one with small light intensity.

Instead of the method of measuring illuminance in the periphery portion of the image forming area A on the liquid-crystal light valve 925G, fine-adjustment of the superimposing lens 930 in the horizontal direction (±X direction) may be automatically or manually performed by measuring luminance in the periphery portion around the projected image on the screen 100 with the liquid-crystal light valve 925G set to allow the illumination light to transmit therethrough to form the image on the screen 100.

When the screen 100 is illuminated as shown in FIG. 5(B), a projected image B' fails to appear on the leftmost portion of the area A' where the image would otherwise be projected as shown in FIG. 5(D). Accordingly, illuminance drops in the leftmost portion. By measuring illuminances Q1 and Q2 on the left-hand side and right-hand side of the area A' where the image is supposed to be projected, the superimposing lens 930 is fine-adjusted in the same manner that fine-adjustment is performed by measuring illuminance on the liquid-crystal light valve 925G. More particularly, the first lens plate 921 is horizontally shifted in its mounting position to the left or to the right until illuminances Q1 and Q2 become a constant value, or the first lens plate 921 is horizontally shifted in its mounting position to the left or to the right until illuminances Q1 and Q2 become equal, or the first lens plate 921 is shifted in its mounting position horizontally to the left or to the right until the sum of illuminances Q1 and Q2 is maximized. As already described, the first lens plate 921 is horizontally shifted in its mounting position to the left or to the right until illuminances Q1 and Q2 become equal or until the sum of illuminances Q1 and Q2 is maximized. Thus, fine-adjustment is carried out without any difficulty even when the light source is changed to one with small light intensity.

Fine-adjustment of the superimposing lens 930 in the vertical direction (±Y direction) may be automatically or manually performed by measuring illuminances above and below the image forming area or the projected image. Like the horizontal fine-adjustment, vertical fine-adjustment is performed by vertically shifting the second lens plate 922 in its mounting position upward or downward until illuminances at two points become a constant value. Alternatively, the second lens plate 922 is vertically shifted in its mounting position upward or downward until the illuminances at two points become equal to each other or until the sum of the illuminances at two points is maximized. These methods work even when the light source is changed to one with small light intensity.

Fine-adjustment of the mounting position of the superimposing lens 930 may be performed using one of the remaining liquid-crystal light valves 925R and 925B as a reference instead of the liquid-crystal light valve 925G.

With the superimposing lens 930 enabled to be fine-adjusted in its mounting position in this way, the necessity is eliminated for setting a wide margin around the image forming area A of the liquid-crystal light valves to cover the offset of the illumination area. Since a narrow margin around the image forming area A works, the efficiency in the utilization of the illumination light is heightened and the brightness of the projected image is increased.

Even with a narrow margin, fine-adjusting the mounting position of the superimposing lens 930 prevents the image forming area A from being left partly unilluminated as shown in FIG. 5(B). The outline of the projected image is thus free from shadowing.

In the projection-type display apparatus 1000, the superimposing lens 930 arranged at the exit side of the integrator optical system 923 is the optical element that controls the illumination area of the liquid-crystal devices. Since the superimposing lens 930 is fine-adjusted in this embodiment, the position of the illumination area of the liquid-crystal light valve is easily and efficiently adjusted. More particularly, the optical components (the first and second lens plates 921, 922) arranged upstream of the superimposing lens 930 in the optical path are fixed and by adjusting only the mounting position of the superimposing lens 930, the position of the illumination area B is adjusted taking into consideration the position errors of the optical components in the optical path upstream of the superimposing lens 930 to easily and efficiently perform the adjustment.

In this embodiment, the mounting position of the superimposing lens 930 is adjustable in only the directions (the ±direction and ±Y direction) orthogonal to the optical axis 1a. If the mounting position of the superimposing lens 930 in the direction of the optical axis 1a (±Z direction) is allowed to be adjustable, the illumination area formed on the liquid-crystal light valve 925 can be fine-adjusted as well. More particularly, if fine-adjustment is performed along the optical axis 1a after the mounting position of the superimposing lens 930 is adjusted in the directions orthogonal to the optical axis 1a, the illumination area can be reduced to the smallest possible size. With an extremely narrow margin, the efficiency in the utilization of light is even more enhanced.

The mounting position of the superimposing lens 930 may be adjustable in any arbitrary direction orthogonal to the optical axis 1a. With the mounting position of the superimposing lens 930 adjustable in any arbitrary direction orthogonal to the optical axis 1a, the distortion of the illumination area B shown in FIG. 7 may be corrected to enhance the illumination uniformity.

An error in the mounting angle of the reflection surface of the reflecting mirror in the optical path for each color beam is also a factor contributing to offsetting the illumination area B of the output light from the superimposing lens 930 off the image forming area A of the liquid-crystal light valve 925. The mounting angle of each reflecting mirror is angled at 45° with respect to the optical axis and if this angle suffers variations the illumination area B will be distorted as shown in FIGS. 7(A) and 7(B). Thus, the image forming area A is partly offset from the illumination area B as shown in FIG. 5(B). If the illuminances on the left-hand side and on the right-hand side of the illumination area B become less uniform, even the advantage presented by the use of the integrator optical system 923 may be lost. For this reason, in the projection-type display apparatus 1000, besides the fine-adjustment of the superimposing lens 930 already described, the angles of the reflection surfaces of the reflecting mirror 943 for reflecting the red light beam R toward the liquid-crystal light valve 925R and the reflecting mirror 972 for reflecting the blue light beam B toward the liquid-crystal light valve 925B shown in FIG. 4 are fine-adjusted about respective axes perpendicular to the planes in which the incident light axis and reflection light axis lie (in the directions shown by the arrows) with respect to the incident light axes. Plate springs and angle adjusting screws similar to those of the position adjusting mechanism for the superimposing lens 930 may be used as the mounting angle adjusting mechanism for the reflecting mirrors.

Figure 8A:
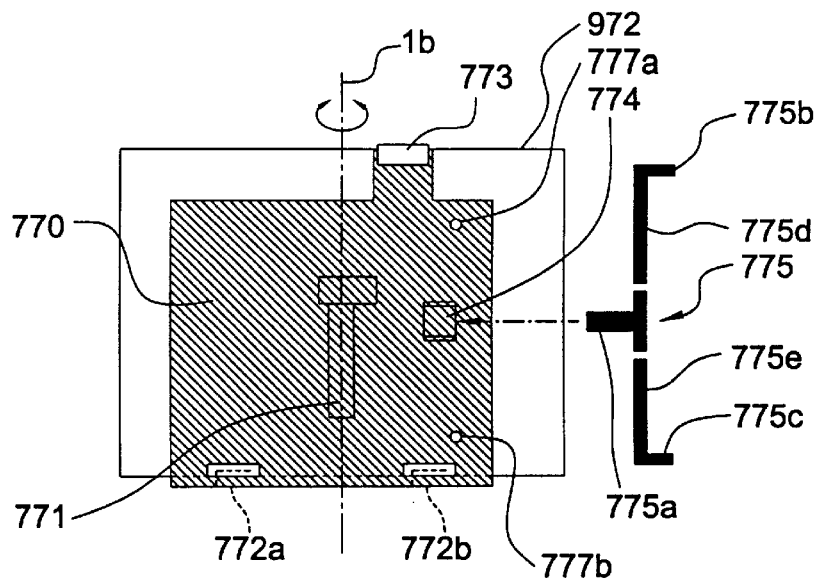
FIGS. 8(A)–8(C) show the mechanism for fine-adjusting the mounting angle of the reflection mirror.
Figures 8B, 8C:
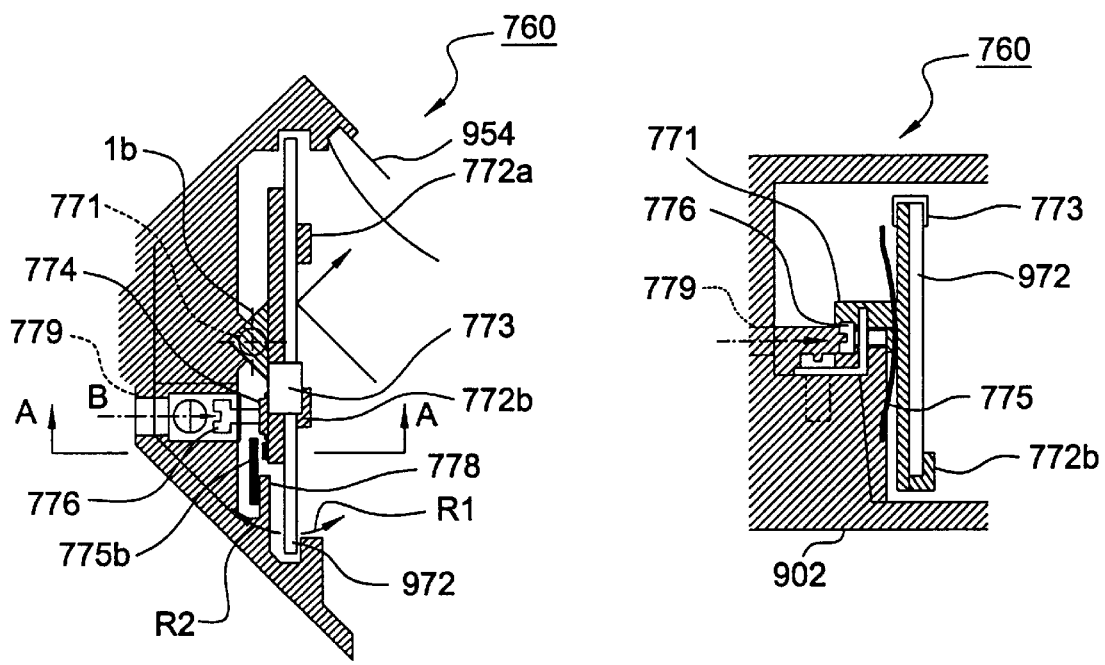

FIGS. 8(A)–8(C) show an example of the mechanism for fine-adjusting the mounting angle of the reflecting mirror 972. FIG. 8(A) shows a holder plate 770 for holding the reflecting mirror 972, FIG. 8(B) shows the mounting angle adjusting mechanism for the reflecting mirror 972 viewed from the side of upper light guide 901. FIG. 8(C) shows the mounting angle adjusting mechanism for the reflecting mirror 972 taken along a cross-section A—A in FIG. 8(A). The mounting angle adjusting mechanism 760 includes the holder plate 770 with its holder sections 772a, 772b supporting the reflecting mirror 972 from the side opposite its reflection surface. The reflecting mirror 972 is also supported at its top edge by a clip 773 on the holder plate 770. The holder plate 770 has a shaft 771 on its center extending vertically. The shaft 771 is rotatably supported by the lower light guide 902. The reflecting mirror 972 is thus permitted to rotate about the axis 1b of the shaft 771 of the holder plate 770 by a predetermined angle of travel.

The holder plate 770 is provided with a holder spring 774 on its one side portion and a first support point 775a of an alignment spring 775 is inserted through the holder spring 774. The arms 775d, 775e of the alignment spring 775 respectively abut spring pads 777a, 777b formed on the holder plate 770. Second and third support points 775b, 775c of the alignment spring 775 abut a support section 778 provided on the lower light guide 902. The holder plate 770 is thus fixed to the lower light guide 902 through the alignment spring 775.

The holder plate 770 is pressed in the direction of the arrow B by an adjusting screw 776 supported by the lower light guide 902. An instrument is inserted through a screw driving port 779 formed in the lower light guide 902 to screw the adjusting screw 776 and increase its screwed depth. The one side portion of the holder plate 770 is pressed in the direction of +B by the adjusting screw 776, and the holder plate 770 is turned about the axis 1b of the shaft 771 in the direction of an arrow R1 as shown in FIG. 8(B). The angle of the reflection surface of the reflecting mirror 972 is changed to increase the angle of incidence of the light incident on the reflecting mirror 972. When the adjusting screw 776 is loosened to decrease its screwed depth on the other hand, one side of the holder plate 770 is drawn in the direction of −B by the alignment spring 775 and the holder plate 770 is turned about the axis 1b of the shaft 771 in the direction of an arrow R2 as shown in FIG. 8(B). The angle of the reflection surface of the reflecting mirror 972 is thus changed to decrease the angle of incidence of the light incident on the reflecting mirror 972. By changing the screwed depth of the adjusting screw 776, the angle of the reflection surface of the reflecting mirror 972 is adjusted about the axis 1b perpendicular to the plane in which the incident light axis and reflected light axis lie and the mounting angle of the reflection surface with respect to the incident light axis is thus adjusted.

The same mechanism as described above may be used as a mechanism for adjusting the angle of the reflection surface of the reflecting mirror 943.

After the mounting angles of the reflecting mirrors 943, 972 are fine-adjusted, an adhesive is applied through adhesive applying ports 906a, 906b, 907a and 907b (FIG. 3) formed in the upper light guide 901 to bond them. Although bonding these mirrors is not necessary, bonded mirrors 943 and 972 are effectively prevented from being offset under external shock.

The above described fine-adjustment may be automatically or manually performed by measuring illuminance in the periphery portion of the image forming area on the liquid-crystal light valve 925R or 925B. When the illumination area B is distorted as shown in FIGS. 7(A) and 7(B), the illuminances on the left-hand side and right-hand side of the illumination area B become less uniform and illuminance unbalance takes place. In the condition shown in FIG. 7(A), the illuminance P1 on the leftmost side is greater than the illuminance P2 on the rightmost side of the image forming area A and in the condition shown in FIG. 7(B), the illuminance P2 on the rightmost side is greater than the illuminance P1 on the leftmost side of the image forming area A. The mounting angles of the reflecting mirrors 943, 972 are adjusted until the illuminances P1, P2 on the left-hand side and right-hand side of the image forming area A become a constant value in the same way the lens plates are fine-adjusted as already described. To comply with the case where the light source is changed to one with small light intensity, the mounting angle of each of the reflecting mirrors 943, 972 is adjusted until the illuminances P1, P2 on the left-hand side and right-hand side of the image forming area A are equalized or until the sum of the illuminances P1, P2 on the left-hand side and right-hand side of the image forming area A is maximized.

Instead of the method of measuring illuminance in the periphery portion of the image forming area A on the liquid-crystal light valve 925R or 925B and in the same way the superimposing lens 930 is fine-adjusted, fine-adjustment of each of the mirrors 943, 972 may be automatically or manually performed by measuring luminance in the periphery portion around the projected image on the screen 100 with the liquid-crystal light valve 925R or 925B set to allow the illumination light to transmit therethrough to form the image on the screen 100. More particularly, when the screen 100 is illuminated in the condition shown in FIG. 7(A) or 7(B), illuminances on the left-hand side and right-hand side of the projected image are unbalanced. By measuring the illuminances on the left-hand side and on the right-hand side of the projected image in the same way the image forming area A is measured in illuminance, the mounting angle of each of the reflecting mirrors 943, 972 is adjusted until illuminances on the left-hand side and on the right-hand side become a constant value, or until illuminances on the left-hand side and on the right-hand side are equalized, or until the sum of the illuminances on the left-hand side and on the right-hand side is maximized.

Both the reflecting mirrors 943 and 972 may be concurrently moved for fine-adjustment. However, fine-adjustments may be sequentially performed by moving the reflecting mirror 943 for angle adjustment using the projected image or the image forming area through the liquid-crystal light valve 925R as a reference and then moving the reflecting mirror 972 for angle adjustment using the projected image or the image forming area through the liquid-crystal light valve 925B as a reference.

Although in this embodiment, the reflecting mirrors 943, 972 respectively closest to the liquid-crystal light valves 925R, 925B are adjustable in their mounting angles, other optical elements, in combination with the light valves 925R, 925B, such as the blue/green-reflecting dichroic mirror 941, green-reflecting mirror 942 and converging lens 971 are all or partly fine-adjusted in mounting angle. Alternatively, instead or the reflecting mirrors 943, 972, these optical elements are all or partly fine-adjusted in mounting angle. The fine-adjustment of the reflecting mirrors 943, 972 respectively closest to the liquid-crystal light valve 925R, 925B in their mounting angle is the most effective in view of the construction of the apparatus and position adjustment accuracy.

Instead of the reflecting mirror 972, the intermediate lens 973 may be adjustable and such an arrangement presents the same advantage as the reflecting mirror 972 fine-adjusted.

With the reflecting mirrors 943, 972 enabled to be fine-adjusted in their mounting angle, the necessity for setting a wide margin around the image forming area A of the liquid-crystal light valve to cover the offset of the illumination area is eliminated. Since a narrow margin around the image forming area A works, the efficiency in the utilization of the illumination light is heightened and the brightness of the projected image is increased.

Even with a narrow margin, fine-adjusting the mounting angles of the reflecting mirrors 943, 972 prevents the image forming area A from being partly offset from the illumination area B as shown in FIGS. 7(A) and 7(B). The outline of the projected image is thus free from shadowing.

Since the distortion of the illumination area B is removed with the reflecting mirrors 943, 972 fine-adjusted, the uniform illumination featured by the integrator optical system 923 is fully exploited and a projected image is presented in an extremely uniform brightness.

The above-described angle adjusting mechanism for the optical elements such as the reflecting mirrors works effectively in a projection-type display apparatus without the integrator optical system 923.

Figure 9:
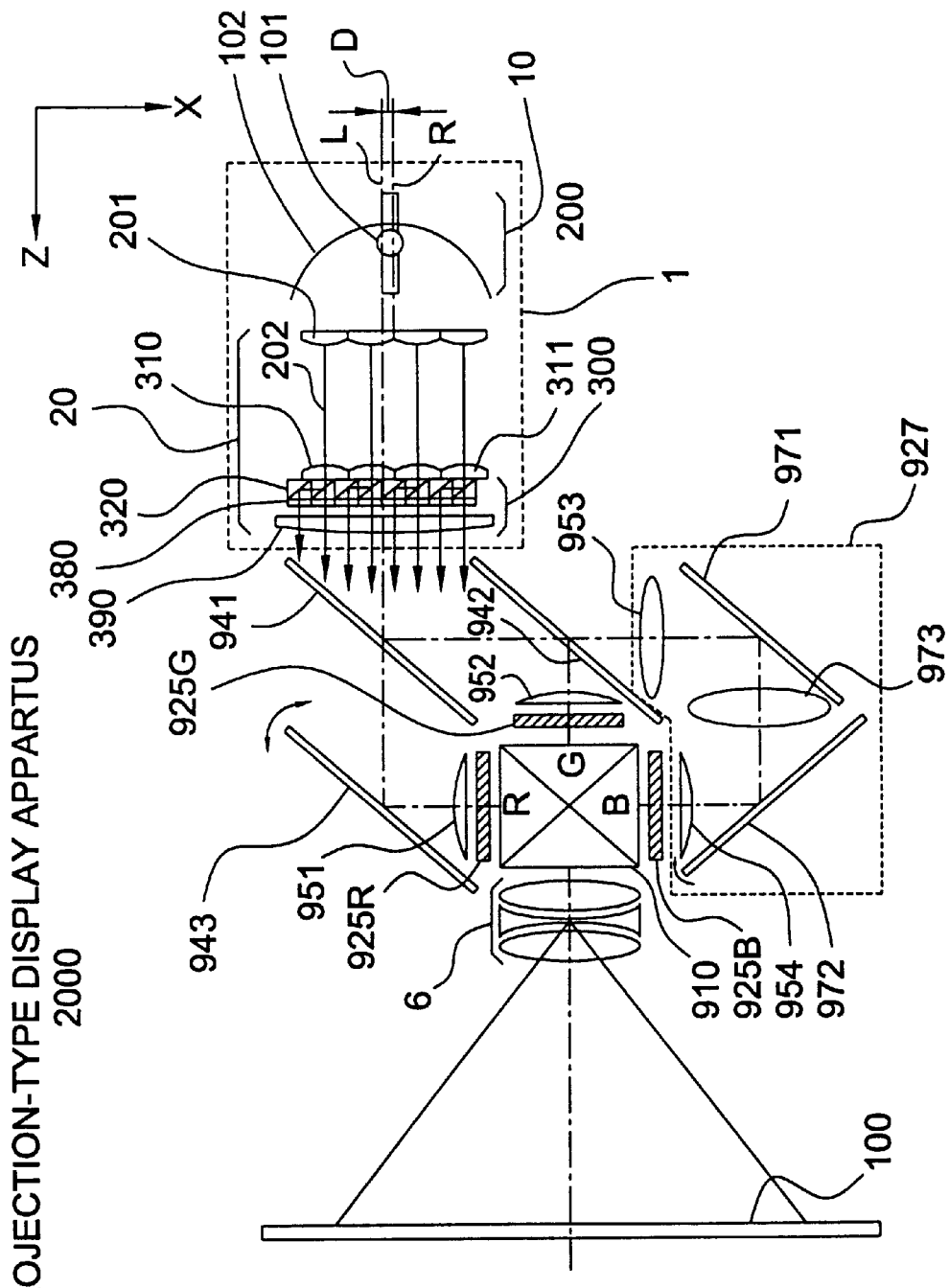
FIG. 9 is a general plan view showing the optical system of another example of the projection-type display apparatus of the present invention.

Another modification of the projection-type display apparatus will now be discussed. FIG. 9 shows the optical system of the projection-type display apparatus 2000 including a polarization illumination unit with an integrator optical system and a polarization beam. splitter with a special configuration. Components equivalent to those described in connection with the projection-type display apparatus 1000 in FIGS. 1 to 8 are designated with the same reference numerals, and the description of them is omitted.

FIG. 9 is a general view of the major portion of the projection-type display apparatus 2000 taken in the XZ plane. The projection-type display apparatus 2000 includes a polarization illumination unit 1, a color separation device for separating a white light beam into three color components, three transmission-type liquid-crystal devices for respectively modulating three color lights according to image information and presenting a display image, a color synthesizing device for synthesizing three color lights to form a color image, and a projection optical system for projecting the color image for presentation.

The polarization illumination unit 1 includes a light source block 10 for outputting randomly polarized light beams in one direction. The randomly polarized light beams from the light source block 10 are converted into almost single type of polarized light beam through a polarization conversion block 20.

The light source block 10 includes a light source lamp 101 and a paraboloidal reflector 102. The light emitted from the light source lamp 101 is reflected by the paraboloidal reflector 102 in one direction and is directed in parallel beams to the polarization conversion block. The light source block 10 is arranged such that the light source optical axis R of the light source block 10 is offset in parallel in the X direction by a distance D from the optical axis L of the system.

The polarization conversion block 20 includes a first optical element 200 and a second optical element 300.

The first optical element 200 corresponds to the first lens plate 921 in the projection-type display apparatus 1000 and includes a matrix of light splitting lenses 201 each having a rectangular shape in cross section in the XZ plane. The light source optical axis R is aligned with the center of the first optical element 200. The light incident on the first optical element 200 is split into a plurality of intermediate light beams 202 that are spatially separated from each other. With the converging effect by the light splitting lenses 201, images of the same number as the light splitting lenses 201 are formed where the intermediate light beams 202 are converged in a plane orthogonal to the system optical axis L (the XZ plane in FIG. 9). The cross-sectional configuration of the light splitting lens 201 in the XY plane is similar to that of the image forming area of a liquid-crystal light valve. In this embodiment, the illumination area has a longer side along the X direction in the XY plane, and the cross-sectional configuration of the light splitting lenses 201 in the XY plane is also rectangular.

The second optical element 300 includes a converging lens array 310, a polarization separation unit array 320, a selective phase plate 380 and a superimposing lens 390 (a superimposing device). The second optical element 300 is disposed in a plane orthogonal to the system optical axis L (the XY plane in FIG. 9) near the position where the images are converged by the first optical element 200. When the light beams incident on the first optical element 200 exhibit excellent parallelism, the second optical element may dispense with the converging lens array 310. The converging lens array 310 as one component of the second optical element 300 and the first optical element 200 correspond to the integrator optical system in the projection-type display apparatus 1000. The second optical element 300 separates spatially each of the intermediate light beams 202 into a p-polarized light beam and an s-polarized light beam, and aligns the direction of one of the light beams with the direction of the other light beam, guides light beams with their polarization direction aligned to a single illumination area.

The converging lens array 310 is substantially identical in construction to the first optical element 200. More particularly, the converging lens array 310 has a matrix of converging lenses 311 having the same number as the light splitting lenses 201 (constituting the first optical element 200) and converges and guides each intermediate light beam 202 at a particular position of the polarization separation unit array 320. Each converging lens is preferably optimized taking into consideration the characteristics of the intermediate light beams 202 formed by the first optical element 200 and an ideal setup that the incident light on the polarization separation unit array 320 has its principal light beam in parallel with the system optical axis L. With a view to a low-cost design of the optical system and ease of design, the one identical to the first optical element 200 may be used as the converging lens array 310, or a converging lens array of converging lenses each having a cross-sectional shape in the XY plane similar to that of the light splitting lens 201 may be used and the one identical to the first optical element 200 is used as the converging lens array 310. The converging lens array 310 may be spaced from the polarization separation unit array 320 closer to the first optical element 200).

Figures 10A, 10B:
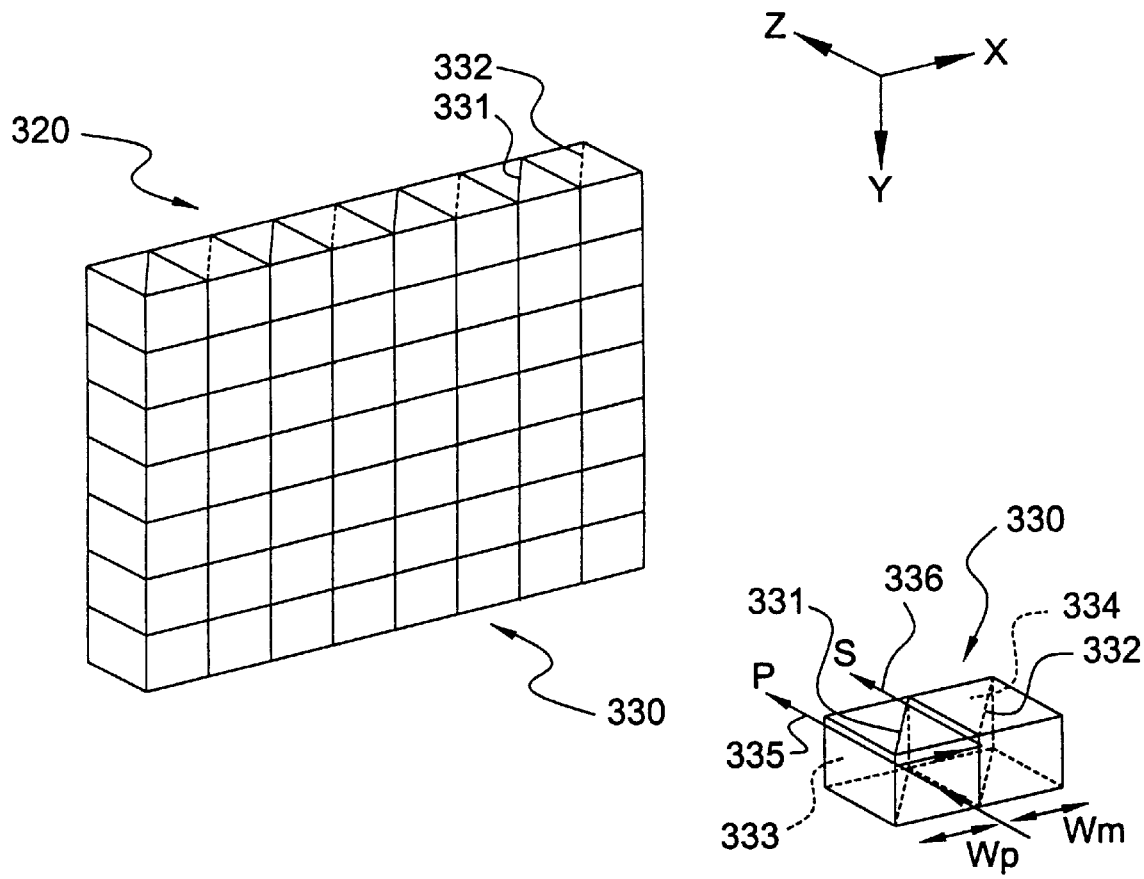
FIG. 10(A) is a perspective view showing a polarization separation unit array of FIG. 7.
FIG. 10(B) is an explanatory view showing the separation process of a polarization light beam by the polarization separation unit array.

In FIGS. 10(A) and 10(B), the polarization separation unit array 320 has a matrix of polarization separation units 330. The first optical element 200 is a matrix of the concentric light splitting lenses 201 with the light splitting lens characteristics and the polarization separation unit array 320 is constructed by arranging identical polarization separation units 330 in the same direction in a matrix. If the polarization separation units in the same column in the Y direction are identical, they are preferably arranged with their longer sides aligned with the Y direction and shorter sides aligned with the X direction to constitute the polarization separation unit array 320 because light loss on the borders between polarization separation units are reduced while the manufacturing cost of the polarization separation unit array is also reduced.

The polarization separation unit 330 is a rectangular prism structure having a polarization separation face 331 and a reflection face 332 inside and spatially separates each of the intermediate light beams into a p-polarized light and an s-polarized light beam. The cross-sectional shape of the polarization separation unit 330 in the XY plane is similar to that of the light splitting lens 201 in the XY plane (i.e., a rectangular shape with its longer sides horizontal). The polarization separation face 331 and reflection face 332 are placed side by side in the horizontal direction (the X direction). As for the polarization separation face 331 and reflection face 332, the polarization separation face 331 is angled at about 45° with respect to the system optical axis L. The reflection face 332 is in parallel with the polarization separation face 331 and both the polarization separation face 331 and reflection face 332 are arranged such that the area on the XY plane to which the polarization separation face 331 is projected equal to the area of a p exit surface 333 to be described later) and is equal to the area on the XY plane to which the reflection face 332 is projected (equal to the area of an s exit surface 334 to be described later). In this embodiment, the width Wp in the XY plane within a region where the polarization separation face 331 is present is set to be equal to the width Wm in the XY plane within a region where the reflection face 332 is present. The polarization separation face 331 is typically manufactured of dielectric multilayers and the reflection face 332 is typically manufactured of dielectric multilayers or an aluminum film.

The light incident on the polarization separation units 330 is separated through the polarization separation face 331 into a p-polarized light beam 335 passing through the polarization separation face 331 and an s-polarized light beam 336 that is reflected off the polarization separation face 331 and changes its direction of travel toward the reflection face 332. The p-polarized light beam 335 is directly output past the p exit surface 333 from the polarization separation unit 330 while the s-polarized light beam 336 changes its direction of travel at the reflection face 332 travels in parallel with the p-polarized light beam 335 and is output past an s exit surface 334 from the polarization separation unit 330. In this way, the randomly polarized light beams incident on the polarization separation units 330 are separated into two types of polarized light beams mutually different in polarization direction (i.e., the p-polarized light beam 335 and the s-polarized light beam 336) both of which are output from two different places (the p exit surface 333 and the s exit surface 334) but in almost the same direction. Since the polarization separation unit 330 works in this way, each intermediate light beam 202 needs to be guided to the region where the polarization separation face 331 of each polarization separation unit 330 is present. For this reason, the positional relationship between the polarization separation units 330 and the respective converging lenses 311 and the lens characteristics of each converging lens 311 are determined so that the intermediate light beam 202 is directed to the center of the polarization separation face 331 of each polarization separation unit 330. In order to align the center axis of each converging lens 311 with the center of the respective polarization separation face 331 in the respective polarization separation unit 330, the converging lens array 310 is shifted by a quarter of the horizontal width W of the polarization separation unit 330 in the X direction relative to the polarization separation unit array 320.

The projection-type display apparatus 2000 of FIG. 9 will now be further discussed.

The selective phase plate 380 constructed of regularly arranged ½ phase plates is disposed at the exit surface side of the polarization separation unit array 320. More particularly, a ½ phase plate is placed at the p exit surface 333 of each polarization separation unit 330 constituting the polarization separation unit array 320 and no ½ phase plate is arranged at each s exit surface 334. With such an arrangement of the ½ phase plates, the p-polarized light beams output from the polarization separation units 330 are subjected to rotation of polarization direction while they pass through the ½ phase plates and are converted to s-polarized light beams. On the other hand, the s-polarized light beams output from the s exit surfaces 334 pass no ½ phase plate, are subjected to no change in polarization direction, and pass through the selective phase plate 380 as they are. The intermediate light beams 202 random in polarization direction are thus converted to one type of polarized light beams (the s-polarized light beams in this case) by the polarization separation unit array 320 and the selective phase plate 380.

The superimposing lens 390, which is disposed at the side of the exit surface of the selective phase plate 380 (i.e., the exit surface of the second optical element 300) guides the light beams, now s-polarized through the selective phase plate 380, to the illumination area of each liquid-crystal device and then superimposes the light beams on the illumination area. The superimposing lens 390 is not necessarily a single lens body, and may be a composite body of a plurality of lenses such as the first optical element 200 or the second lens plate 922 in the aforementioned projection-type display apparatus 1000.

In summary, one of the functions of the second optical element 300 is to superimpose the intermediate light beams 202 split by the first optical element 200 (i.e., an image segmented by the light splitting lenses 201) on the illumination area. Through its polarization separation unit array 320, the second optical element 300 spatially separates the intermediate light beams 202, which are the randomly polarized light beams, into the two types of polarized light beams mutually different in polarization direction and converts them into a single type of polarized light beams through the selective phase plate 380. The image forming area of the liquid-crystal light valve is thus substantially uniformly illuminated with an almost single type of polarized light beams.

The polarization illumination unit 1 converts the randomly polarized light beams emitted from the light source block 10 into an almost single type of polarized light beams through the polarization conversion block 20 constructed of the first optical element 200 and second optical element 300 and illuminates the image forming area of the liquid-crystal light valve with the well aligned polarized light beams. Since the process of generating polarized light beams is associated with no substantial light loss, almost all of the light emitted from the light source block 10 is guided to the image forming area of the liquid-crystal light valve and the efficiency in the utilization of the light is very high.

Since the converging lens array 310, polarization separation unit array 320 and selective phase plate 380, all constituting the second optical element 300 are optically integrated in this embodiment, the light loss taking place in borders or interfaces are reduced and the efficiency in the utilization of the light is further enhanced.

To be compatible with the rectangular shape of the image forming area with its horizontal sides longer, each light splitting lens 201, constituting the first optical element 200, is also made rectangular with its horizontal sides longer, and the two types of polarized light beams output from the polarization separation unit array 320 are arranged in the horizontal direction (the X direction). Because of this, even the image forming area having a rectangular shape with its horizontal sides longer is illuminated, no light quantity is wasted, and the illumination efficiency (an utilization of light) of the liquid-crystal light valve is enhanced.

If light beams random in polarization direction are simply separated into a p-polarized light beam and an s-polarized light beam, the entire width of each beam after separation is doubled, and the optical system is accordingly enlarged. In the polarization illumination unit 1 of this embodiment, the first optical element 200 forms a plurality of small converging images, a space, generated in the course of the forming process of the images and having no light within, is skillfully exploited in a manner such that the reflection face 332 of the polarization separation unit 330 is arranged in that space, the horizontal expansion of each light beam arising from the separation of the beam into two beams is accommodated and the entire width of the light beam is free from expansion thus permitting a compact optical system design.

The projection-type display apparatus 2000 having the polarization illumination unit 1 employs a liquid-crystal device that modulates a single type of polarized light beams. If a conventional illumination device is used to guide randomly polarized light beams to the liquid-crystal device, polarizers (not shown) will absorb and convert almost half the randomly polarized light beams into heat, thereby not only degrading utilization of light but also requiring a noisy and large cooling device to control heat emitted from the polarizers. The protection-type display apparatus 2000 substantially eases this problem.

In its polarization illumination unit 1, the projection-type display apparatus 2000 rotates the polarization direction of one type of polarized light beams only (e.g., p-polarized light beams only) through the ½ phase plates to align them with the other type of polarized light beams (e.g., s-polarized light beams in polarization direction). For this reason, an almost single type of polarized light beams with their polarization directions aligned is guided to three liquid-crystal light valves 925R, 925G, and 925B, absorption by the polarizers is extremely small, utilization of the light is enhanced to result in a bright projected image.

The polarization illumination unit 1 spatially separates two types of polarized light beams in the horizontal direction (the X direction) in the second optical element 300. The polarization illumination unit 1 therefore wastes no light quantity and is best suited to illuminate a rectangular liquid-crystal device with its horizontal sides longer.

The polarization illumination unit 1 restricts the expansion of the light beam output from the incorporated polarization separation unit array 320 regardless of the incorporated polarization conversion optical elements. This means that when a liquid-crystal device is illuminated, practically no lights are incident on the liquid-crystal device with a large angle with respect thereto. A highly bright projected image is therefore formed without using a small f-number, large aperture projection lens. As a result, a compact projection-type display apparatus is provided.

Like the projection-type display apparatus 1000 already described, in the projection-type display apparatus 2000 the mounting position of the superimposing lens 390 disposed at the side of the exit surface of the polarization illumination unit 1 may be adjustable in the direction orthogonal to the optical axis L so that the illumination areas of the liquid-crystal light valves 925R, 925G and 925B by the polarization illumination unit 1 are fine-adjusted horizontally forward or backward and horizontally to the left or to the right and the image forming area of each liquid-crystal device is continuously kept within the illumination area.

The lens mounting position adjusting mechanism described in FIG. 6 is available as a mechanism for adjusting the mounting position of the superimposing lens 390. The fine-adjustment procedure and advantages achieved by the position adjustment of the illumination area remain unchanged from those already described in connection with the projection-type display apparatus 1000.

In the projection-type display apparatus 2000, fine-adjusting the mounting position of the superimposing lens 390 eliminates the need for setting a wide margin around the image forming area of the liquid-crystal device to cover the offset of the illumination area as in the conventional art. Since a narrow margin around the image forming area works, the utilization of the illumination light is increased and the projected image is brightened.

Even with a narrow margin, fine-adjusting the mounting position of each optical prevents the image forming area of the liquid-crystal device from being partly offset from the illumination area of the polarization separation unit array. The outline of the projected image is thus free from shadowing.

In the polarization illumination unit 1, the superimposing lens 390 for superimposing the intermediate light beams on the illumination area is the optical element that controls the illumination area of the liquid-crystal device. With the superimposing lens 390 enabled to be fine-adjusted in this embodiment, the mounting position of the superimposing lens 390 only is adjusted with the optical components upstream of the superimposing lens 390 in the optical path fixed and the position of the illumination area B is thus adjusted taking into consideration the position errors of the optical components such as the first optical element 200 upstream of the superimposing lens 390 in the optical path. The position of the illumination area of the liquid-crystal light valve is efficiently adjusted and adjusting procedure itself is not time consuming.

An error in the mounting angle of the reflection surface of the reflecting mirror in the optical path for each color beam is also a factor contributing to offsetting the illumination area of the liquid-crystal device by the polarization illumination unit 1 from the image forming area of the liquid-crystal device. The mounting angle of each reflecting mirror is angled at 45° with respect to the optical axis. If this angle suffers variations, the illumination area will be distorted (FIGS. 7(A) and 7(B)) and the illumination area is partly projected out of the image forming area of the liquid-crystal device. When the illumination area is distorted in this way, the illuminances on the left-hand side and on the right-hand side of the illumination area become unbalanced, and even the advantage presented by the use of the polarization illumination unit 1 may be lost.

In the projection-type display apparatus 2000, the angles of the reflection surfaces of the reflecting mirrors 943, 972 in the respective color beam optical paths may be fine-adjusted with respect to the incident light axes about the axes perpendicular to the planes in which the incident light axis and the reflection light axis line (in the direction of the arrow in FIG. 9). The mounting position of the intermediate lens 973 arranged between the reflecting mirrors 943, 972 may be adjusted vertically upward or downward and horizontally to the left or to the right. The angle adjusting mechanism described in reference to FIG. 8 may be the mechanism for adjusting the mounting angle of each reflecting mirror. The lens mounting position adjusting mechanism described with reference to FIG. 6 may be the mechanism for adjusting the mounting position of the intermediate lens 973.

In the two preceding embodiments, the liquid-crystal light valves 925R, 925G and 925B are of a transmission type light valve. The present invention maybe equally applied to a projection-type display apparatus employing a reflection-type liquid-crystal device. An example of the projection-type display apparatus employing a reflection-type light valve instead of a transmission-type light valve will now be described. In a projection-type display apparatus 3000 of this embodiment, components identical to those described with reference to FIGS. 9 and 10 are designated with the same reference numerals and the description of them is not repeated.

Figure 11:
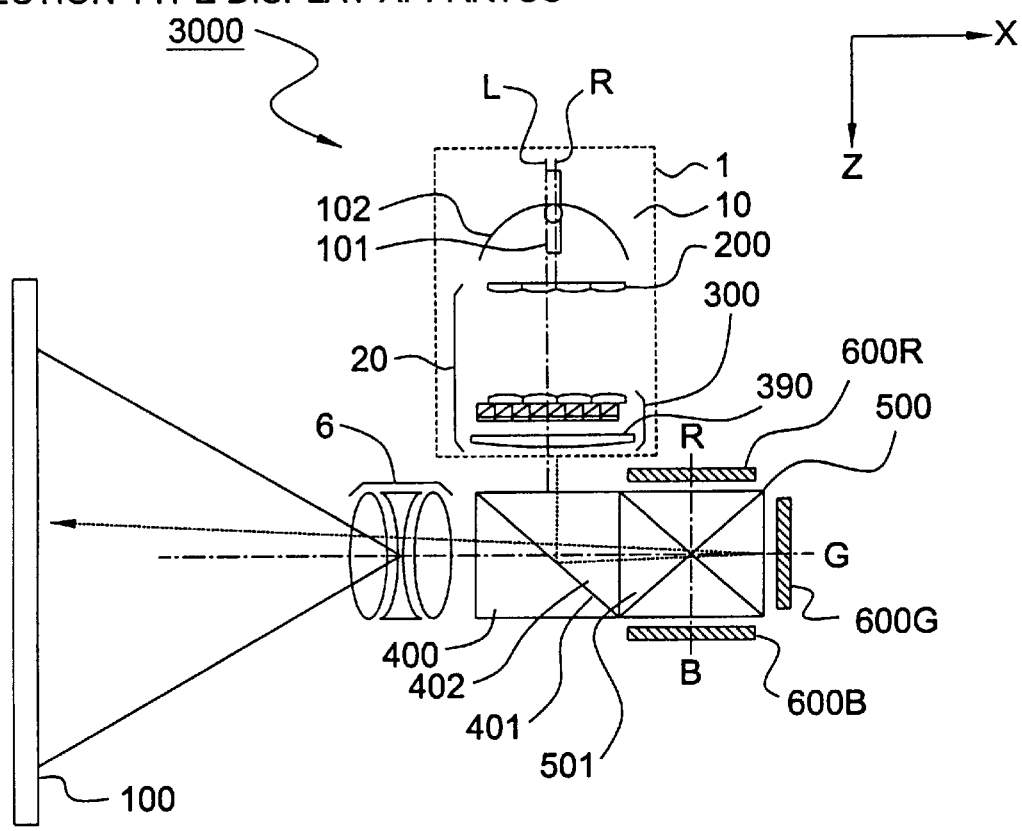
FIG. 11 is a general plan view showing the optical system of another example of the projection-type display apparatus of the present invention.

FIG. 11 shows the major portion of the projection-type display apparatus 3000 of this embodiment. FIG. 11 is a cross-sectional view of the second optical element 300 taken along the XZ plane.

A polarization beam splitter 400 includes a prism 401 that has an s-polarized light beam reflecting face 401 that reflects an s-polarized light beam at 45° with respect to the XZ plane in FIG. 11 and permits a p-polarized light beam to transmit therethrough. Since the light beams output from the second optical element 300 are the ones having an almost single polarization direction, almost all light beams are reflected or transmitted through the polarization beam splitter 400. In this embodiment, the light beams output from the second optical element 300 are s-polarized light beams and the s-polarized light beams are bent at a right angle by an s-polarized light beam reflecting face 401 and are introduced to a prism unit 500 to which a dichroic film is glued in a cross configuration, and are separated into three color components R, G and B. Separated color component lights are respectively directed to reflection-type liquid-crystal devices 600R, 600G and 600B arranged along three sides of the dichroic prism 500. The light beams introduced into the reflection-type liquid-crystal devices 600R, 600G and 600B are modulated there.

Figure 12:
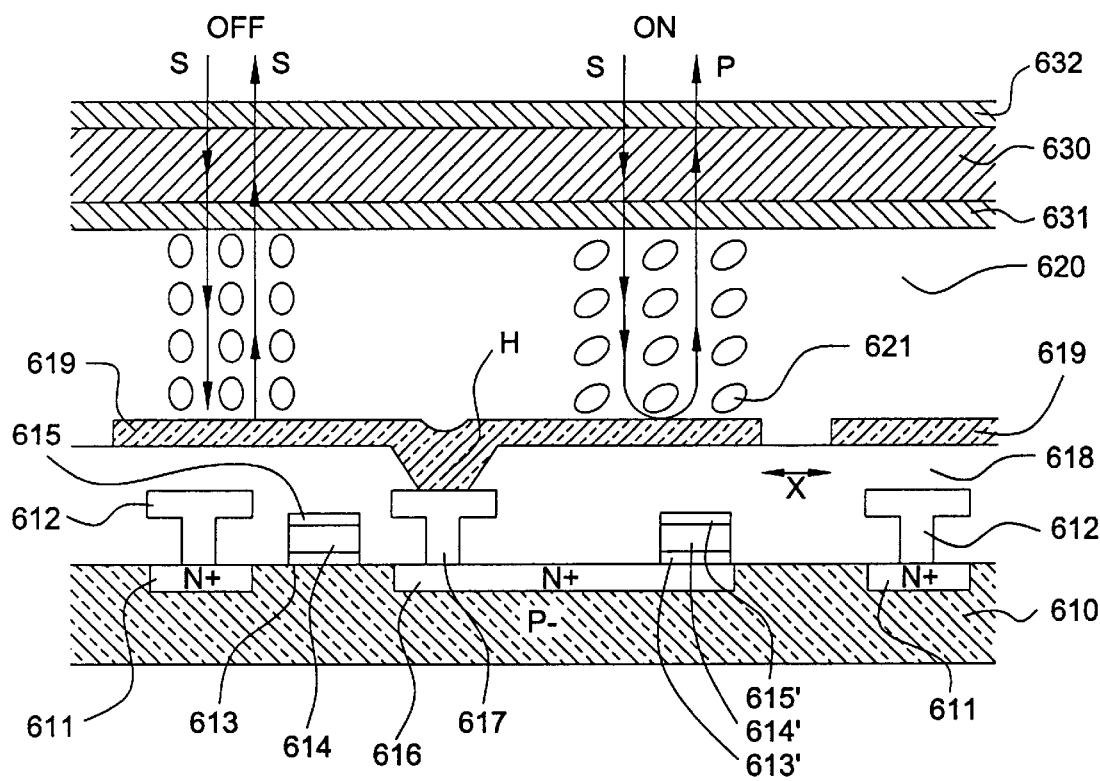
FIG. 12 is an explanatory view showing the operation of the reflection-type liquid-crystal device of FIG. 9.
Figure 13:
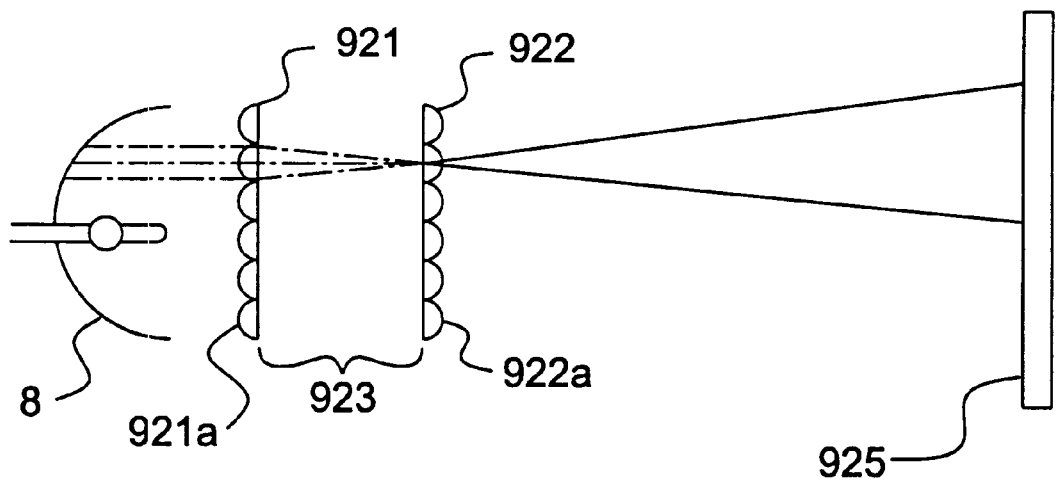
FIG. 13 is a general view of the optical system of a typical projection-type display apparatus equipped with an integrator optical system.
Figure 14:
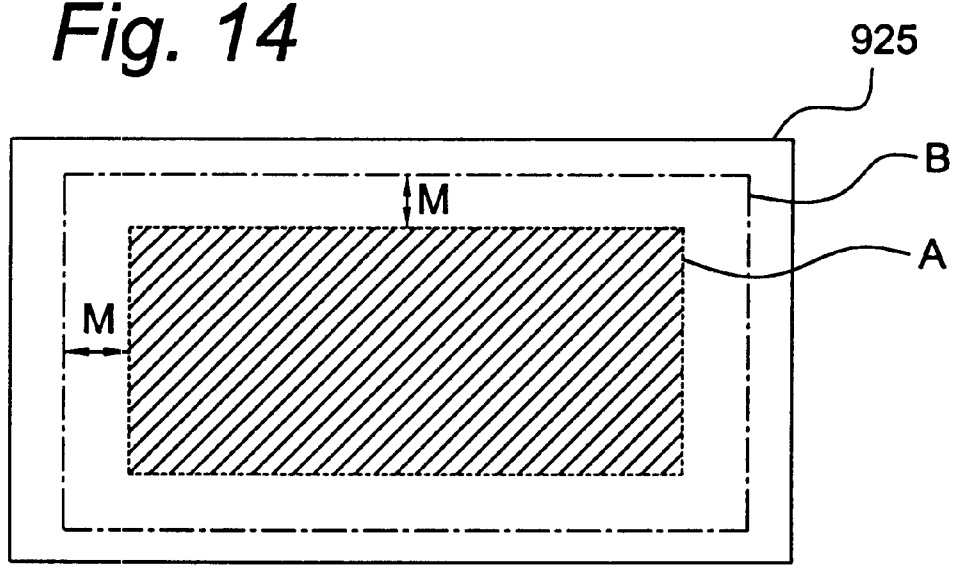
FIG. 14 is an explanatory view showing the relationship between an illumination area and an image forming area in a liquid-crystal light valve.

FIG. 12 shows an example of the reflection-type liquid-crystal devices 600R, 600G, and 600B. The reflection-type liquid-crystal devices 600R, 600G, and 600B are an active matrix liquid-crystal device in which pixels are arranged in a matrix with a TFT switching element connected to each pixel and a liquid-crystal layer 620 interposed between a pair of substrates 610, 630. The substrate 610 is manufactured of silicon and has a source 611 and a drain 616. Also formed on the substrate 610 are a source electrode 612 and a drain electrode 617, both made of aluminum layers, a channel of silicon dioxide 613, a gate electrode of a silicon layer 614 and a tantalum layer 615, an interlayer insulating layer 618, and a reflection pixel electrode 619 of an aluminum layer, and the drain electrode 617 and the reflection pixel electrode 619 are electrically connected through a contact hole H. Since the reflection pixel electrode 619 is opaque, the interlayer insulating layer 618 is laminated over the gate electrode, the source electrode 612 and the drain electrode 617. Since the spacing between adjacent pixel electrodes 619 is made fairly small, a large aperture ratio of the device is permitted and a projected image is brightened. A holding capacitance may also be formed by the drain 616, a silicon dioxide layer 613', a silicon layer 614' and an tantalum layer 615'.

The opposed substrate 630 has an opposed electrode 631 of ITO on its side facing the liquid-crystal layer 620 and an anti-reflection layer 632 on the other side. A super-homeotropic type in which liquid-crystal molecules 621 orient vertically with no voltage applied (OFF) and twist by 90° with a voltage applied (ON) may be employed as the liquid-crystal layer 620 in this embodiment. As shown in FIG. 4, with no voltage applied (OFF), the s-polarized light beams are introduced from the polarization beam splitter 400 to the reflection-type liquid-crystal devices 600R, 600G and 600B are returned to the polarization beam splitter 400 without changing the polarization direction from the reflection-type liquid-crystal devices 600R, 600G and 600B, and are reflected by the s-polarized light beam reflecting face 401 without reaching the projection lens unit 6. With the voltage applied (ON), the s-polarized light beams introduced from the polarization beam splitter 400 to the reflection-type liquid-crystal devices 600R, 600G and 600B are converted to p-polarized light beams with their polarization direction changed by the twist of the liquid-crystal molecules 621, pass through the s-polarized light beam reflecting face 401, and are then projected to the screen 100 via the projection lens unit 6.

The operation of the projection-type display apparatus 3000 will now be discussed with reference to FIG. 11. The light beams modulated through the reflection-type liquid-crystal devices 600R, 600G and 600B are synthesized by the prism unit 500 and are then projected to the screen 100 through the polarization beam splitter 400 and projection lens unit 6.

In the projection-type display apparatus 3000, the illumination area of the liquid-crystal device by the polarization illumination unit 1 is adjusted to its appropriate position and shape by enabling to be adjustable vertical upward or downward and horizontally to the left or to the right the mounting position of the superimposing lens 390 disposed at the side of the exit surface of the second optical element 300 constituting the polarization conversion block 20 in the polarization illumination unit 1. The position adjusting mechanism, procedure and advantage remain unchanged from those already described in connection with the projection-type display apparatus 2000.

Besides the advantage attributed to the adjustment of the illumination area, the projection-type display apparatus 3000 presents the same advantages as those of the above-described projection-type display apparatuses and further offers the following advantage. Since the color separation device and the color synthesizing device are integrated into the same prism unit, the optical path length is substantially shortened. The large aperture ratio of the liquid-crystal device minimizes light loss. A bright projected image is thus obtained without using a large aperture lens. With the first optical element and the second optical element, uniform polarized light beams with no illuminance variations are obtained, making the display area and the entire projection screen area uniform quality to result in an extremely bright projected image.

Although the reflection-type liquid-crystal devices 600R, 600G and 600B are used as the reflection-type modulating device in this embodiment, reflection-type modulating devices of non-liquid crystal type may be used because its construction, materials of each element, and mode of operation the liquid-crystal layer 620 are not limited to those already described above.

If a prism 403 constituting the polarization beam splitter 400 and a prism 501 constituting the prism unit 500 is integrated into a single prism, light loss taking place at the border therebetween will be eliminated and the utilization of light will be enhanced.

Although the above examples have been discussed in connection with the fine-adjustment mechanisms of the optical elements in the projection-type display apparatuses for projecting a color image, these fine-adjustment mechanisms are equally applied to a projection-type display apparatus for protecting a monochrome image.

The present invention is not limited to the layout of the optical systems, and modifications in the layout still fall within the scope of the present invention.

Besides the projection-type discussed above in which an image is projected to the screen from the viewing side of the screen, a rear-projection-type for projecting an image from the side opposite the viewing side of the screen is available. The present invention is applied to this rear-projection-type display apparatus.

As described above, the projection-type display apparatus of the present invention permits the mounting position of the superimposing device to be adjustable for superimposing a plurality of intermediate light beams on the image forming area of the modulating device. When the reflection device is arranged in the optical path between the light source and the modulating device, the mounting angle of the reflection device is made adjustable. Since the position of the illumination area by the illumination light that illuminates the modulating means is fine-adjusted, the illumination area is positioned such that it always includes the image forming device of the modulating device within.

The above arrangement makes it unnecessary to set a large margin around the image forming area to cover the offset of the illumination area from the image forming area of the modulating device. The utilization of the illumination light is thus enhanced and the brightness of the projected image is heightened. Since the illumination area by the illumination light is positioned such that it includes the image forming area, no shadow is generated around the projected image.

Since the mounting position is fine-adjusted of the superimposing device, which is an optical component chiefly determining the illumination area of the modulating device, the adjustment of the position of the illumination area is thus performed taking into consideration the mounting errors of optical components (optical elements) in front of the superimposing device (upstream of the superimposing means). The position of the illumination area of the modulating device is easily and efficiently adjusted.

While the invention has been described in relation to preferred embodiments, many modifications and variations are intended to be within the scope of the present invention as defined in the append claims.

What is claimed is:

1. A projection-type display apparatus comprising:
   a light source that emits a light beam;
   a modulator having an image forming area, the modulator receives the light beam emitted by the light source and outputs a modulated light beam;
   a projection lens that projects the light beam modulated by the modulator;
   an optical element, disposed in an optical path between the light source and the modulator, the optical element splits the light beam into a plurality of intermediate light beams; and
   a superimposor capable of being adjusted to different mounting positions that superimposes each of the intermediate light beams onto the image forming area of the modulator.

2. The projection-type display apparatus of claim 1, further comprising a reflector capable of being adjusted to different mounting angles with respect to an incident optical axis and being provided in the optical path between the light source and the modulator.

3. The projection-type display apparatus of claim 1, further comprising:
   a color separating optical system provided between the superimposor and the modulator to separate light output from the superimposor into color light beams;
   a plurality of modulators connected with the color separating optical system to produce modulated color light beams;
   a color synthesizing optical system that receives the modulated color light beams and outputs enlarged synthesized color light beams which are projected by the projection lens; and
   a reflector disposed in an optical path between the color separating optical system and at least one of the plurality of modulators and having an adjustable mounting angle with respect to an incident optical axis.

4. The projection-type display apparatus of claim 3, wherein a mounting angle of the reflector located closest to the modulator is adjustable.

5. The projection-type display apparatus of claim 3, wherein the modulator is a reflection type modulator.

6. A projection-type display apparatus comprising:
   a light source that outputs a light beam;
   a first optical element that splits the light beam output from the light source into a plurality of intermediate light beams;
   a second optical element including a polarization conversion unit that outputs polarized light beams and a superimposor that superimposes light beams output from the polarization conversion unit, the superimposor having an adjustable mounting position, the second optical element arranged in a vicinity of a position where the intermediate light beams are converged, the second optical element separates the intermediate light beams from the first optical element into a p-polarized light beam and an s-polarized light beam, the second optical element aligns a polarization direction of one of the p-polarized light beam and the s-polarized light beam with a polarization direction of the other of the p-polarized light beam and the s-polarized light beam, and the second optical element outputs the resulting light beams;
   a modulator that receives and modulates the light beams emitted from the second optical element; and
   a projection lens that projects the light beam modulated by the modulator.

7. The projection-type display apparatus of claim 6, further comprising a reflector provided in an optical path between the light source and the modulator, the reflector having an adjustable mounting angle with respect to an incident optical axis.

8. The projection-type display apparatus of claim 6, further comprising:
   a color separating optical system provided between the superimposor and the modulator to separate light output from the superimposor into color light beams;
   a plurality of modulators connected with the color separating optical system to produce modulated light beams;
   a color synthesizing optical system that receives the modulated color light beams and outputs enlarged synthesized color light beams which are projected by the projection lens; and
   a reflector disposed in an optical path between the color separating optical system and at least one of the plurality of modulators and having adjustable mounting angle with respect to an incident optical axis.

9. The projection-type display apparatus of claim 8, wherein a mounting angle of the reflector located closest to the modulator is adjustable.

10. The projection-type display apparatus of claim 8, wherein the modulator is a reflection type modulator.

11. A projection-type display apparatus comprising:
    a light source that emits a light beam;
    a modulator having an image forming area, the modulator modulates the light beam emitted by the light source;
    a projection lens that projects the light beam modulated by the modulator and a projector screen;
    an optical element, located in an optical path between the light source and the modulator, the optical element splits the light beam emitted from the light source into a plurality of intermediate light beams;
    a superimposor that superimposes each of the intermediate light beams from the optical element onto the image forming area of the modulator; and an adjustment mechanism connected with the superimposor to adjust a mounting position of the superimposor.

12. The projection-type display apparatus of claim 11, further comprising:
   a first adjustment mechanism connected with the superimposor to adjust the mounting position of the superimposor in a first direction orthogonal to an optical axis; and
   a second adjustment mechanism connected with the superimposor to adjust the mounting position of the superimposor in a second direction orthogonal to the optical axis and the first direction.

13. The projection-type display apparatus of claim 12, wherein the adjustment mechanism comprises:
   a base adjustment plate;
   a first adjustment plate slidably movable in the first direction relative to the base adjustment plate; and
   a second adjustment plate slidably movable in the second direction relative to the first adjustment plate.

14. The projection-type display apparatus of claim 13, wherein the adjustment mechanism comprises a first slip prevention mechanism that prevents the first adjusting plate from slipping in the second direction and a second slip prevention mechanism that prevents the second adjustment plate from slipping in the first direction.

15. The projection-type display apparatus of claim 13, wherein the superimposor is fixed to the second adjustment plate.

16. A projection-type display apparatus comprising:
   a light source that outputs a light beam;
   a first optical element that splits a light beam output from the light source into a plurality of intermediate light beams;
   a second optical element including a polarization conversion unit that outputs polarized light beams and a superimposor that superimposes light beams output from the polarization conversion unit, the second optical element arranged in a vicinity of a position where the intermediate light beams are converged, the second optical element separates the intermediate light beams from the first optical element into a p-polarized light beam and an s-polarized light beam, the second optical element aligns a polarization direction of one of a p-polarized light beam and the s-polarized light beam with a polarization direction of the other of the p-polarized light beam and the s-polarized light beam, and the second optical element outputs the resulting light beams;
   a modulator that receives and modulates the light beams emitted from the second optical element;
   a projection lens that projects the light beam modulated by the modulator; and
   an adjusting mechanism that adjusts a mounting position of the superimposor.

17. The projection-type display apparatus of claim 16, further comprising:
   a first adjustment mechanism that adjusts the mounting position of the superimposor in a first direction orthogonal to an optical axis; and
   a second adjustment mechanism that adjusts the mounting position of the superimposor in a second direction orthogonal to the optical axis and the first direction.

18. The projection-type display apparatus of claim 17, wherein the adjustment mechanism comprises:
   a base adjustment plate;
   a first adjustment plate slidably movable in the first direction relative to the base adjustment plate; and
   a second adjustment plate slidably movable in the second direction relative to the first adjustment plate.

19. The projection-type display apparatus of claim 18, wherein the adjustment mechanism comprises a first slip prevention mechanism that prevents the first adjustment plate from slipping in the second direction and a second slip prevention mechanism that prevents the second adjustment plate from slipping in the first direction.

* * * * *